United States Patent
Gelbin et al.

(10) Patent No.: US 7,902,280 B2
(45) Date of Patent: Mar. 8, 2011

(54) LIQUID STYRENATED PHENOLIC COMPOSITIONS AND PROCESSES FOR FORMING SAME

(75) Inventors: Michael E. Gelbin, Middlebury, CT (US); Jonathan S. Hill, Flixton (GB); Maurice Power, Old Trafford (GB); Jun Dong, Cheshire, CT (US); Cyril A. Migdal, Pleasant Valley, NY (US); Gerard Mulqueen, Watertown, CT (US); Joseph F. Stieber, Prospect, CT (US)

(73) Assignee: Chemtura Corporation, Middlebury, CT (US)

( * ) Notice: Subject to any disclaimer, the term of this patent is extended or adjusted under 35 U.S.C. 154(b) by 329 days.

(21) Appl. No.: 12/168,675

(22) Filed: Jul. 7, 2008

(65) Prior Publication Data

US 2009/0005478 A1    Jan. 1, 2009

Related U.S. Application Data

(63) Continuation-in-part of application No. 11/825,449, filed on Jul. 6, 2007, and a continuation-in-part of application No. 12/069,631, filed on Feb. 11, 2008.

(60) Provisional application No. 60/903,725, filed on Feb. 26, 2007, provisional application No. 60/931,954, filed on May 24, 2007, provisional application No. 60/936,918, filed on Jun. 21, 2007.

(51) Int. Cl.
*B32B 7/12* (2006.01)

(52) U.S. Cl. ......... 524/186; 524/323; 524/115; 524/109; 252/404; 508/584

(58) Field of Classification Search .................. 524/186
See application file for complete search history.

(56) References Cited

U.S. PATENT DOCUMENTS

| | | | |
|---|---|---|---|
| 3,310,491 A | 3/1967 | Jones | |
| 3,331,879 A | 7/1967 | Leston | |
| 3,407,147 A | 10/1968 | Chew | |
| 3,558,490 A | 1/1971 | Lowe | |
| 3,956,247 A | 5/1976 | Landi et al. | |
| 4,107,144 A | 8/1978 | Russell et al. | |
| 4,119,552 A * | 10/1978 | Davis et al. | 508/194 |
| 4,153,562 A | 5/1979 | Jaruzelski | |
| 4,281,091 A * | 7/1981 | Strazik et al. | 525/518 |
| 4,532,209 A * | 7/1985 | Hagedorn | 435/156 |
| 5,140,055 A | 8/1992 | Hirata et al. | |
| 5,466,740 A | 11/1995 | Miyata | |
| 6,242,562 B1 | 6/2001 | Kobayashi et al. | |
| 6,339,132 B1 | 1/2002 | Kobayashi et al. | |
| 6,391,065 B1 | 5/2002 | Cooke | |
| 6,559,267 B2 * | 5/2003 | Kaufhold et al. | 528/76 |
| 6,599,865 B1 | 7/2003 | Esche, Jr. et al. | |
| 6,797,677 B2 | 9/2004 | Esche, Jr. et al. | |
| 7,214,648 B2 | 5/2007 | Saini et al. | |
| 7,214,649 B2 | 5/2007 | Loper et al. | |
| 7,229,951 B2 | 6/2007 | Migdal et al. | |
| 2006/0069000 A1 * | 3/2006 | Dong et al. | 508/422 |
| 2006/0128574 A1 | 6/2006 | Dong et al. | |

FOREIGN PATENT DOCUMENTS

| | | |
|---|---|---|
| GB | 1111751 A | 5/1968 |
| JP | 02-011533 A | 1/1990 |

* cited by examiner

*Primary Examiner* — Vasu Jagannathan
*Assistant Examiner* — Doris L Lee
(74) *Attorney, Agent, or Firm* — Joseph Suhadolnik

(57) ABSTRACT

Disclosed herein are highly stable styrenated phenolic compositions that are liquids at room temperature, and polymer articles and lubricant compositions containing such styrenated phenolic compositions. Also disclosed are processes for forming such styrenated phenolic compositions, which processes afford distyrenated phenolics assaying at 70% minimum by total GC area, comprising reacting styrene with one or more phenolics, e.g., at least one of phenol, p-cresol and/or o-cresol, in the presence of an acid catalyst, preferably a sulfonic acid catalyst, at elevated temperature, wherein the resulting product mixture comprises one or more monostyrenated phenolics, one or more distyrenated phenolics, and one or more tristyrenated phenolics.

13 Claims, No Drawings

US 7,902,280 B2

LIQUID STYRENATED PHENOLIC COMPOSITIONS AND PROCESSES FOR FORMING SAME

CROSS-REFERENCE TO RELATED APPLICATIONS

This is a continuation-in-part of co-pending U.S. patent application Ser. No. 11/825,449, filed Jul. 6, 2007, and of co-pending U.S. patent application Ser. No. 12/069,631, filed Feb. 11, 2008, which claims priority to U.S. Provisional Application No. 60/903,725, filed Feb. 26, 2007, U.S. Provisional Application No. 60/931,954, filed May 24, 2007, and U.S. Provisional Application No. 60/936,918, filed Jun. 21, 2007. The entire contents and disclosure of each of these applications is incorporated herein by reference.

FIELD OF THE INVENTION

The present invention relates to liquid sytrenated phenolic compositions. More particularly, the present invention relates to liquid sytrenated phenolic compositions, to processes for forming liquid styrenated phenolic compositions and to their use in the stabilization of polymers and lubricants.

BACKGROUND OF THE INVENTION

There is a continuing need for phenolic antioxidants having a liquid physical form in a number of polymer markets, such as thermoplastics, thermoelastomers, rubber, and lubricants. For many phenolic antioxidants, the liquid physical form can only be brought about by heating them to temperatures above their melting points. Examples include octadecyl-3,5-di-tert-butyl-4-hydroxycinnamate, the melting point of which is in the range from between 48° C. and 58° C., and 2,6-di-tert-butyl-p-cresol, whose melting point is approximately 69° C.

A major drawback associated with offering a compound that is solid at room temperature in its molten state, is that, in order to retain it in a liquid physical form, continued heating is required. Heating, however, is not always sustainable and, therefore, the molten product may cool and form a solid. Once solidified, it becomes all but impossible to transfer the compound out of its storage container, which may be necessary to convey it to the polymer to be stabilized. On the other hand, returning it to a liquid physical form requires re-heating, but re-melting a solid material in a closed container can be a laborious and drawn out process. Thus, the situation can lead to process delays, thereby adding unnecessary cost.

Thus, the need exists for the development of antioxidants or stabilizers, particularly for polymer and lubricant applications, that either match or exceed the stabilizer efficiency of industry standards while maintaining desirable flow and shelf life characteristics at normal handling temperatures.

Another problem, particularly for additives in polymer applications, such as polyurethane applications, especially foamed polyurethane applications, is the emission of additives from the polymer. Polyurethane-type foam products are commonly used in automotive interior applications, e.g., seating or dashboards, and there is a growing concern over the level of additives that may be emitted from plastics used in such applications. Polyurethane foams are commonly made from polyether polyols (polyols), which commonly include one or more antioxidants, and diisocyanates. The antioxidants are typically contained in the polyol component for improved stability and low color. The phenomenon of additives being emitted from automotive interior plastics is sometimes known as fogging. Once deposited, they may cause the windshield or other windows to fog up. The concern over automotive interior fog, however, is not simply a matter of safety owing to impaired visibility, but, rather, is also fueled by concern for the health of the car's occupants. Thus, the need also exists for polymers, e.g., polyurethanes such as foamed polyurethanes, having low fog characteristics compared to industry standard controls.

U.S. Pat. No. 3,956,247 discloses that the solution halogenation of EPDM (rubbery terpolymer of ethylene, an alpha mono-olefin, and a nonconjugated diene) in the presence of an epoxy compound, such as epoxidized soybean oil, with or without a poly(alkylene ether) glycol yields a halogenated EPDM of excellent viscosity stability and limited gel content. A mixture of two parts of nonylated phenyl phosphite and one part of styrenated-p-cresol can be employed as an antioxidant.

U.S. Pat. No. 5,140,055 discloses that a rubber composition containing a specifically limited imidazole compound or imidazoline compound, or benzimidazole or its specifically limited derivative has a large tan δ at high temperature range, and a tire having a tread using such rubber composition is prevented from being lowered in the value of tan δ due to the temperature rising during the running and has an improved grip performance during the high speed running. The use of Bronsted acid in combination with the imidazole, imidazoline or benzimidazole can obviate the drawback of poor scorch resistance of a rubber composition containing the imidazole, imidazoline or benzimidazole alone. The Bronsted acid to be used includes phenol derivatives, carboxylic acids, sulfonic acids, sulfuric acid and its derivatives, phosphoric acid and its derivatives, cyanuric acid and its derivatives, sulfinic acid, nitric acid and its derivatives, phosphorous acid and carbonic acid and its derivatives. Compounds listed as useful include 2,6-di-tert-butyl-p-cresol, 2,2'-methylenebis-4-methyl-6-tert-butylphenol, 4,4'-thiobis-3-methyl-6-tertbutylphenol, styrenated p-cresol, phosphoric acid, phosphoric acid esters, phosphorous acid, and phosphorous acid esters, among many others.

U.S. Pat. No. 5,466,740 discloses a halogen-containing resin composition made stable to heat and light, by incorporating (a) a calcium-based composite metal hydroxide and a calcium-based composite metal oxide, (b) a β-diketone compound or metal salt thereof, and optionally (c) an organic acid salt of zinc. The halogen-containing resin composition may contain conventional additives, such as organic tin stabilizers, epoxy stabilizers, phosphorous acid esters, sulfur-containing compound stabilizers, phenolic stabilizers, and antioxidants, e.g., styrenated p-cresol, 2,6-di-tert-butyl-4-methylphenol, butylated anisol, 4,4'-methylenebis (6-tert-butyl-3-methylphenol), 2,2'-methylenebis (6-tert-butyl-4-methylphenol), 1,3,5-trimethyl-2,4,6-tris(3,5-di-tert-butyl-4-hydroxybenzyl)benzene, and tetrakis [3-(4-hydroxy-3,5-di-tert-butylphenyl)propionyloxymethylene]methane.

U.S. Pat. No. 6,242,562 discloses a process for producing a vinyl chloride polymer that includes the steps of: (A) suspension polymerizing vinyl chloride or a monomer mixture containing vinyl chloride, in an aqueous medium to obtain a polymer slurry; (B) stripping unreacted monomers remaining in the polymer slurry; and (C) subjecting the polymer slurry having passed through the step (B), to dehydration at a temperature of from 80° C. to 95° C., preferably within 60 minutes after the stripping. More specifically, first, vinyl chloride or a monomer mixture containing vinyl chloride, an aqueous medium, a polymerization initiator and a dispersant are charged into a polymerization vessel, and a prescribed polymerization temperature (usually from 30 to 75° C.) is maintained with stirring to polymerize the vinyl chloride or the monomer mixture. At the time the polymerization has reached a prescribed degree (usually from 60 to 98%), the polymerization is terminated by, e.g., adding to the reaction mixture an antioxidant having a polymerization inhibitory action, e.g., phenol type antioxidants, such as styrenated p-cresol, among many others.

U.S. Pat. No. 6,339,132 discloses a process for regenerating unreacted vinyl chloride monomers including the step of compressing by means of an compressor an unreacted vinyl chloride monomer recovered from a process of vinyl chloride polymer production; and compressing the same in contact with a lubricating oil fed into the compressor. In this process, the lubricating oil contains a polymerization inhibitor having a polymerization inhibitory action to the vinyl chloride monomer. Such a polymerization inhibitor may be exemplified by phenol type inhibitors, such as styrenated p-cresol, among many others; amine type inhibitors; sulfur type inhibitors; and phosphorus type inhibitors, which can be used singly or in combination of two or more.

U.S. Pat. No. 6,391,065 discloses a water-dilutable UV light absorber composition and method for improving the lightfastness of dyed textiles. The composition is applied to the textiles and includes an ultraviolet light absorbing agent and an organic solvent suitable for dissolving the ultraviolet light absorbing agent. Example 5 of the patent discloses adding 10.0 g of benzyl-benzoate into 20.0 g "Naugard 529" liquid anti-oxidant/solvent (alkylated-styrenated p-cresol) to reduce viscosity.

SUMMARY OF THE INVENTION

In one embodiment, the present invention is directed to a liquid styrenated phenolic composition, comprising: (a) at least one distyrenated phenolic in an amount from about 70 to about 98 percent by total Gas Chromatography area; (b) at least one monostyrenated phenolic in an amount greater than 1 percent, e.g., greater than 5 percent, by total Gas Chromatography area; and (c) at least one tristyrenated phenolic in an amount greater than 1 percent, e.g., greater than 5 percent, by total Gas Chromatography area. Optionally, the composition comprises the at least one monostyrenated phenolic in an amount less than 10 percent by total Gas Chromatography area and the at least one tristyrenated phenolic in an amount less than 10 percent by total Gas Chromatography area. The composition preferably comprises the monostyrenated phenolic and the tristyrenated phenolic, in combination, in an amount from 5 to 20 percent by total Gas Chromatography area. Preferably, the composition, as formed, has an acid number less than 0.1 mg KOH/gram and has an APHA color value of less than 150, e.g., less than 100. The composition preferably has a viscosity of less than 40,000 cPs at 25° C. The composition optionally further comprises: (d) a diluent in an amount from 0.5 to 20 weight percent, based on the total weight of (a)-(d).

The composition may also include a co-stabilizer, which, for example, may be selected from the group consisting of phenolics, phosphites, diaryl amines, and epoxidized vegetable oils. In one aspect, the co-stabilizer is an organophosphite, e.g., tris(nonylphenyl)phosphite. One optional organophosphite is Weston® NPF 705. In another aspect, the co-stabilizer is a dialkylated diphenylamine.

In another aspect, the invention is to a polymer article comprising a polymer and any of the above-described styrenated phenolic composition. The polymer may, for example, be selected from the group consisting of polyolefins, PVC, polyurethanes, polyols and elastomers. In another aspect, the polymer is styrene-butadiene rubber. The polymer article preferably comprises a polyol or a polyurethane and the composition exhibits low fog.

In another aspect, the invention is a lubricant comprising a base stock of lubricating viscosity and the above-described styrenated phenolic composition. The lubricant composition preferably comprises the base stock in an amount greater than 90 weight percent, and the styrenated phenolic in an amount greater than 0.05 weight percent, based on the weight of the lubricant. The lubricant comprises the lubricant base stock in an amount greater than 95 weight percent, and the styrenated phenolic in an amount from 0.1 to 5 weight percent, based on the weight of the lubricant.

In a particularly preferred embodiment, the lubricant composition further comprises at least one antioxidant comprising one or more secondary diarylamines having the general formula:

$(R_4)_a$—$Ar_1$—$NH$—$Ar_2$—$(R_5)_b$ wherein $Ar_1$ and $Ar_2$ are independent and comprise aromatic hydrocarbons, $R_4$ and $R_5$ are independent and comprise hydrogen and hydrocarbyl groups and a and b are independent and 0 to 3, provided that (a+b) is not greater than 4.

In one aspect, the at least one monostyrenated phenolic comprises monostyrenated p-cresol, the at least one distyrenated phenolic comprises distyrenated p-cresol, and the at least one tristyrenated phenolic comprises tristyrenated p-cresol.

In another aspect, the at least one monostyrenated phenolic comprises a mixture of monostyrenated o-cresol and monostyrenated p-cresol, the at least one distyrenated phenolic comprises a mixture of distyrenated o-cresol and distyrenated p-cresol, and the at least one tristyrenated phenolic comprises a mixture of tristyrenated o-cresol and tristyrenated p-cresol. For example, the composition may comprise the distyrenated p-cresol in an amount greater than 1 percent by total Gas Chromatography area, and the distyrenated o-cresol in an amount greater than 1 percent by total Gas Chromatography area.

In another aspect, the at least one monostyrenated phenolic comprises a mixture of monostyrenated phenol and monostyrenated p-cresol, the at least one distyrenated phenolic comprises a mixture of distyrenated phenol and distyrenated p-cresol, and the at least one tristyrenated phenolic comprises a mixture of tristyrenated phenol and tristyrenated p-cresol. The composition may, for example, comprise the monostyrenated phenol in an amount greater than 1 percent by total Gas Chromatography area, the distyrenated phenol in an amount greater than 1 percent by total Gas Chromatography area, and the tristyrenated phenol in an amount greater than 1 percent by total Gas Chromatography area.

In another aspect, the at least one monostyrenated phenolic comprises a mixture of monostyrenated phenol and monostyrenated o-cresol, the at least one distyrenated phenolic comprises a mixture of distyrenated phenol and distyrenated o-cresol, and the at least one tristyrenated phenolic comprises a mixture of tristyrenated phenol and tristyrenated o-cresol. The composition may, for example, comprise the monostyrenated phenol in an amount greater than 1 percent by total Gas Chromatography area, the distyrenated phenol in an amount greater than 1 percent by total Gas Chromatography area, and the tristyrenated phenol in an amount greater than 1 percent by total Gas Chromatography area.

In another aspect, the invention is to a process for forming a liquid styrenated phenolic composition, comprising the step of reacting styrene with at least one phenolic in the presence of a sulfonic acid catalyst in a reaction vessel at an elevated temperature to form a product mixture comprising at least one distyrenated phenolic in an amount from 70 to 98 percent by total Gas Chromatography area, a monostyrenated phenolic in an amount greater than 1 percent by total Gas Chromatography area, and a tristyrenated phenolic in an amount greater than 1 percent by total Gas Chromatography area. In this embodiment, the phenolic preferably has the general formula:

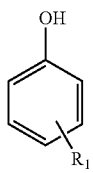

wherein $R_1$ is hydrogen or methyl. The product mixture preferably is a liquid at room temperature.

For example, the at least one phenolic may comprise one or more of phenol, p-cresol, o-cresol, a mixture of o-cresol and p-cresol, a mixture of phenol and p-cresol, a mixture of phenol and o-cresol, or a mixture of o-cresol, p-cresol and phenol. In one embodiment, the product mixture comprises distyrenated p-cresol in an amount greater than 1 percent by total Gas Chromatography area, and distyrenated o-cresol in an amount greater than 1 percent by total Gas Chromatography area. In another embodiment, the product mixture comprises monostyrenated phenol in an amount greater than 1 percent by total Gas Chromatography area, distyrenated phenol in an amount greater than 1 percent by total Gas Chromatography area, and tristyrenated phenol in an amount greater than 1 percent by total Gas Chromatography area. In another embodiment, the product mixture comprises monostyrenated phenol in an amount greater than 1 percent by total Gas Chromatography area, distyrenated phenol in an amount greater than 1 percent by total Gas Chromatography area, and tristyrenated phenol in an amount greater than 1 percent by total Gas Chromatography area. The product mixture preferably comprises the at least one monostyrenated phenolic in an amount greater than 5 percent by total Gas Chromatography area, and preferably comprises the at least one tristyrenated phenolic in an amount greater than 5 percent by total Gas Chromatography area. The product mixture preferably comprises the monostyrenated phenolic in an amount less than 10 percent by total Gas Chromatography area and the tristyrenated phenolic in an amount less than 10 percent by total Gas Chromatography area. The product mixture preferably comprises the monostyrenated phenolic and the tristyrenated phenolic, in combination, in an amount from 5 to 20 percent by total Gas Chromatography area.

The sulfonic acid catalyst employed in the process preferably is selected from the group consisting of trifluoromethane sulfonic acid and trichloromethane sulfonic acid. In other aspects, the sulfonic acid catalyst is selected from the group consisting of methane sulfonic acid, ethane sulfonic acid, methyl trichloromethane sulfonic acid, methyl trifluoromethane sulfonic acid, ethyl trichloromethane sulfonic acid and ethyl trifluoromethane sulfonic acid. The sulfonic acid catalyst optionally is present in an amount ranging from 1 wppm to 1000 wppm, based on the total weight of the styrene, the phenolic and the catalyst added to the reaction vessel.

The styrene and the phenolic preferably are reacted at a molar ratio of 1.85:1 to 2.1:1, respectively. Ideally, the product mixture has an acid number of less than 0.1 mg KOH/gram, and preferably has an APHA color value of less than 150, e.g., less than 100.

In another embodiment, the invention is directed to a process for the preparation of a mixture of styrenated phenolics, e.g., one or more of phenol, o-cresol, and/or p-cresol, that is liquid at room temperature and preferably has a viscosity of less than 40,000 cps at 25° C. The process affords corresponding distyrenated phenolics assaying at 70% minimum by total GC area. The process comprises the step of reacting styrene with one or more phenolics, e.g., one or more of phenol, o-cresol, and/or p-cresol, at a molar ratio of 1.85 to 2.1:1, respectively, in the presence of an acid catalyst, e.g., a sulfonic acid, at elevated temperature, wherein the mixture comprises at least one monostyrenated phenolic, at least one distyrenated phenolic, and at least one tristyrenated phenolic and has an acid number of less than 0.1 mg KOH/gram.

In another aspect, the present invention is directed to a method for stabilizing a polymeric composition comprising including in said composition an effective amount of a mixture of styrenated phenolics, e.g., p-cresol, that is liquid at room temperature and has a viscosity of less than 40,000 cps at 25° C., wherein said mixture is prepared by a process yielding distyrenated phenolics, e.g., 2,6-distyryl-p-cresol, with an assay of 70% minimum by total GC area and comprises reacting styrene with a phenolic, e.g., p-cresol, at a molar ratio of 1.85 to 2.1:1, respectively, in the presence of an acid catalyst, e.g., a sulfonic acid catalyst, at elevated temperature, wherein said mixture comprises at least one monostyrenated phenolic, e.g., monostyrenated p-cresol, at least one distyrenated phenolic, e.g., distyrenated-p-cresol, and at least one tristyrenated phenolic, e.g., tristyrenated p-cresol, and has an acid number of less than 0.1 mg KOH/gram.

In still another aspect, the present invention is directed to a composition comprising a mixture of styrenated p-cresol species that is liquid at room temperature, has a viscosity of less than 40,000 cps at 25° C., comprising 2,6-distyrenated p-cresol assaying at 70% minimum by total GC area percent prepared by a process comprising reacting styrene with p-cresol at a molar ratio of 1.85 to 2.1:1, respectively, in the presence of an acid catalyst at elevated temperature, wherein said mixture comprises monostyrenated-p-cresol, distyrenated-p-cresol, and tristyrenated-p-cresol and has an acid number of less than 0.1 mg KOH/gram.

DETAILED DESCRIPTION OF THE INVENTION

Introduction

The present invention pertains to styrenated phenolic compositions that are liquids at room temperature. In one embodiment, the present invention is directed to a liquid styrenated phenolic composition, comprising at least one distyrenated phenolic in an amount from about 70 to about 98 percent by total Gas Chromatography area; at least one monostyrenated phenolic in an amount greater than 1 percent, e.g., greater than 5 percent, by total Gas Chromatography area; and at least one tristyrenated phenolic in an amount greater than 1 percent, e.g., greater than 5 percent, by total Gas Chromatography area. Optionally, the composition comprises the at least one monostyrenated phenolic in an amount less than 10 percent (but greater than 1 percent) by total Gas Chromatography area and the at least one tristyrenated phenolic in an amount less than 10 percent (but greater than 1 percent) by total Gas Chromatography area. The composition preferably comprises the monostyrenated phenolic and the tristyrenated phenolic, in combination, in an amount from 5 to 20 percent by total Gas Chromatography area. The styrenated phenolic compositions of the invention preferably have a room temperature viscosity of less than 40,000 cPs.

It has surprisingly and unexpectedly been discovered that the styrenated phenolics of the present invention are highly stable liquids at room temperature (25° C.) and typically possess highly desirable color and clarity characteristics, e.g., exhibiting a APHA color value less than 150, e.g., less than 100 or less than 80. As a result, the styrenated phenolic compositions of the invention are easily handled and well-suited for the stabilization of polymer articles and lubricants.

In another embodiment, the invention is to processes for forming such styrenated phenolic compositions using a sulfonic acid catalyst. The invention also is directed to polymer articles and lubricants that are stabilized with such styrenated phenolic compositions.

Processes for Forming Styrenated Phenolic Compositions

The styrenated phenolic compositions of the present invention preferably are prepared by reacting styrene with one or more phenolics, preferably at a molar ratio of from about 1.85:1 to about 2.1:1, respectively, at an elevated temperature in the presence of an acid catalyst, preferably a sulfonic acid catalyst, to provide a mixture of styrenated phenolic species. A preferred styrene:phenolic molar ratio is from 1.75 to 2.2:1, e.g., from 1.85 to 1.98:1, from 1.9 to 1.98:1, or about 1.95:1. The phenolic employed in the reaction with styrene to form the liquid styrenated phenolics of the invention may vary widely, but in preferred embodiments is selected from one or more of phenol, p-cresol, m-cresol and o-cresol.

Scheme 1, below, depicts a typical reaction, in which the phenolic is p-cresol. As shown, the p-cresol reacts with styrene in the presence of an acid catalyst, preferably a sulfonic acid catalyst, to form monostyrenated p-cresol, distyrenated p-cresol and tristyrenated p-cresol.

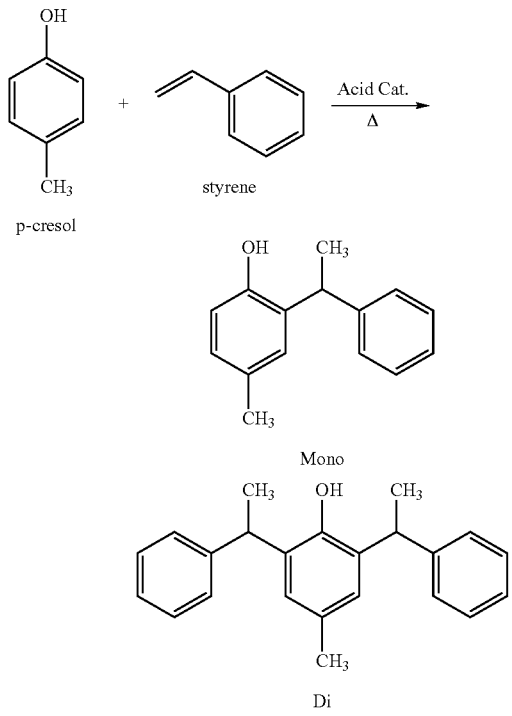

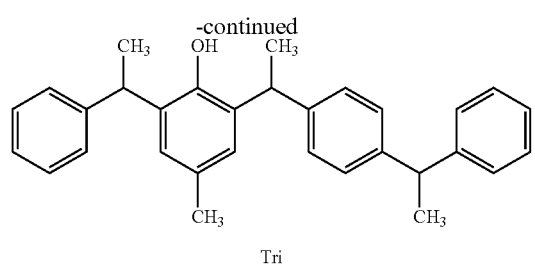

Typical Pathway for Making a Styrenated Phenolic Composition Liquid at Room Temperature The main product in the product mixture is the distyrenated phenolic, (e.g., 2,6-di-styrenated-p-cresol in Scheme 1) assaying at 70% minimum, e.g., 75% minimum, 80% minimum, or 90% minimum, by total Gas Chromatography (GC) area. The distyrenated phenolic of the product mixture and various isomers thereof are referred to herein as the "Di" product. In terms of ranges, the Di product may be present in the product mixture in an amount ranging, for example, from about 70 to 98%, e.g., from 80 to 95%, from 80 to 92%, from 80 to 85%, from 85 to 95% or from 90 to 95%, as determined by total GC area. Preferably, minor amounts of the corresponding monostyrenated phenolic ("Mono") and tristyrenated phenolic ("Tri") are also formed in the reaction process, as illustrated in Scheme 1, above, for p-cresol. As those skilled in the art will appreciate, many different Tri compounds and isomers may be formed in the reaction (only one Tri compound is illustrated) and the term "Tri," as used herein, refers to each of these various species collectively, so long as the relevant phenolic has three styryl groups associated therewith. Thus, the terms "Mono," "Di" and "Tri" as used herein refer to phenolics (e.g., one or more of phenol, p-cresol and/or o-cresol) that have been substituted with one, two or three styryl groups, respectively, including various isomers thereof.

As indicated above, the phenolic that is styrenated according to the process may vary widely. Preferred phenolics include phenol, o-cresol, p-cresol and mixtures thereof. Thus, the phenolic preferably has the general formula:

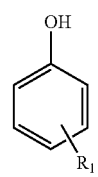

wherein $R_1$ is hydrogen or methyl.

In one embodiment, for example, the phenolic comprises p-cresol. In this aspect, the at least one monostyrenated phenolic comprises monostyrenated p-cresol, the at least one distyrenated phenolic comprises distyrenated p-cresol, and the at least one tristyrenated phenolic comprises tristyrenated p-cresol.

In another aspect, the phenolic comprises a mixture of o-cresol and p-cresol. As a result, the at least one monostyrenated phenolic comprises a mixture of monostyrenated o-cresol and monostyrenated p-cresol, the at least one distyrenated phenolic comprises a mixture of distyrenated o-cresol and distyrenated p-cresol, and the at least one tristyrenated phenolic comprises a mixture of tristyrenated o-cresol and tristyrenated p-cresol. For example, the composition or product mixture may comprise the distyrenated p-cresol in an amount greater than 1 percent by total Gas Chromatography area, and the distyrenated o-cresol in an amount greater than 1 percent by total Gas Chromatography area.

In another embodiment, the phenolic comprises a mixture of phenol and p-cresol. Thus, the at least one monostyrenated phenolic comprises a mixture of monostyrenated phenol and monostyrenated p-cresol, the at least one distyrenated phenolic comprises a mixture of distyrenated phenol and distyrenated p-cresol, and the at least one tristyrenated phenolic comprises a mixture of tristyrenated phenol and tristyrenated p-cresol. The composition or product mixture may, for example, comprise the monostyrenated phenol in an amount greater than 1 percent by total Gas Chromatography area, the distyrenated phenol in an amount greater than 1 percent by total Gas Chromatography area, and the tristyrenated phenol in an amount greater than 1 percent by total Gas Chromatography area.

In yet another embodiment, the phenolic comprises a mixture of phenol and o-cresol. In this aspect, the at least one monostyrenated phenolic comprises a mixture of monostyrenated phenol and monostyrenated o-cresol, the at least one distyrenated phenolic comprises a mixture of distyrenated phenol and distyrenated o-cresol, and the at least one tristyrenated phenolic comprises a mixture of tristyrenated phenol and tristyrenated o-cresol. The composition or product mixture may, for example, comprise the monostyrenated phenol in an amount greater than 1 percent by total Gas Chromatography area, the distyrenated phenol in an amount greater than 1 percent by total Gas Chromatography area, and the tristyrenated phenol in an amount greater than 1 percent by total Gas Chromatography area.

Similarly, the phenolic may comprises a mixture of phenol, o-cresol and p-cresol, in which case the at least one monostyrenated phenolic comprises a mixture of monostyrenated phenol, monostyrenated o-cresol, and monostyrenated p-cresol. In this case, the at least one distyrenated phenolic comprises a mixture of distyrenated phenol, distyrenated o-cresol, and distyrenated p-cresol, and the at least one tristyrenated phenolic comprises a mixture of tristyrenated phenol, tristyrenated o-cresol and tristyrenated p-cresol. The composition or product mixture may, for example, comprise the monostyrenated phenol in an amount greater than 1 percent by total Gas Chromatography area, the distyrenated phenol in an amount greater than 1 percent by total Gas Chromatography area, and the tristyrenated phenol in an amount greater than 1 percent by total Gas Chromatography area.

Regardless of the phenolic employed the process, as indicated above, the liquid physical form of the styrenated phenolic compositions of the invention is achieved by incorporating two additional reaction products, namely the Mono and Tri products, in the resultant styrenated phenolic composition. In addition, the styrenated phenolic compositions of the invention preferably possess improved clarity and have a color value of less than 150 APHA, e.g., less than 100 APHA, or less than 80 APHA. Hereinafter, for convenience, the stabilizers of the present invention will be referred to simply as styrenated phenolic compositions; however, it should be understood that the actual product is a mixture of the Mono, Di, and Tri compositions, as described above.

The relative amounts of Mono, Di and Tri compositions formed in the process may be controlled by controlling the relative ratios of the reactants. Generally, for example, an increase in styrene:phenolic molar ratio will tend to favor formation of Tri over Mono. Conversely, lower styrene:phenolic molar ratios will favor the formation of Mono over Tri.

Typically, the styrene is added to the phenolic, e.g., one or more of phenol, o-cresol and/or p-cresol, rather than adding the phenolic to the styrene, which may undesirably lead to polymerization of the styrene prior to or during addition of the phenolic. In one aspect, the styrene is added to heated phenolic that has been heated to a temperature ranging from 50 to 90° C., e.g., from 55 to 85° C., from 60 to 80° C., or preferably about 70° C.

In one embodiment, the reaction is run isothermally, i.e., at a single elevated temperature, throughout the reaction process. Preferably, the reaction is run at a temperature in the range of from about 40° C. to about 150° C., more preferably in the range of from about 60 to about 80° C.

The formation of the Mono species tends to occur quickly, but the formation of the Di species tends to occur more slowly. The rate of formation of the Di species may be increased, however, by increasing the temperature of the reaction mixture. Thus, in another embodiment, a two stage temperature scheme is employed, in which the reactants are heated to a first temperature for a first time period, and then the reaction mixture is heated to a second "finishing" temperature for a second time period. The first temperature optionally ranges from 50 to 90° C., e.g., from 55 to 85° C., from 60 to 80° C., or preferably about 70° C., and the first time period may range from 1 to 10 hours, e.g., from 1 to 4 hours, from 2 to 4 hours or from 2.5 to 3.5 hours. For purposes of the present specification, the first time period begins when the reactants initially contact one another, e.g., when styrene is first added to the phenolic. The second temperature optionally ranges from 60 to 110° C., e.g., from 70 to 110° C., from 75 to 110° C., from 80 to 100° C., or preferably about 90° C., and the second time period may range from 0.25 to 4 hours, e.g., from 1 to 4 hours, from 2 to 4 hours or from 2.5 to 3.5 hours. Extended heating times may lead to darkening of the resulting reaction mixture and, depending on the intended use, may be undesirable. The difference between the second and first temperatures preferably is greater than 10° C., e.g., greater than 15° C., and most preferably is about 20° C. In terms of ranges, the difference between the second and first temperatures optionally is from 10 to 70° C., e.g., from 10 to 50° C., or from 15 to 25° C. In this embodiment, the reaction process may occur in a single reactor, where the temperature may be increased from the first temperature to the second temperature, or, alternatively, in two or more separate reactors. For example, the reactants may first be added to a first reactor that is held at the first temperature, and then the resulting mixture directed to a second reactor, which is held at the second temperature for the completion of the process.

In another embodiment, the temperature may be gradually increased or ramped throughout the reaction process or through a portion of the reaction process. For example, the temperature may be gradually increased, e.g., at a rate of from 0.01 to 2° C./min, at a rate of from 0.02 to 1° C./min, or at a rate of from 0.02 to 0.1° C./min, optionally for a period of time ranging from 0.5 to 8 hours, e.g., from 2 to 8 hours or from 4 to 8 hours.

The overall reaction time will normally be in the range of from about one to about seven hours, preferably, in the range of from about three to about four hours. If desired, the reaction can be run in a solvent that is inert thereto, which will preferably be a hydrocarbon, such as toluene, benzene, heptane, hexane, and the like. The process may be run in a continuous process, a semi-continuous process or a batch process.

Catalyst

In the styrenation of phenolics preferably occurs in the presence of a catalyst. Suitable catalysts typically have acidic properties, e.g., Brönsted acids or Lewis acids. However, some acid catalysts are known to impart a yellow color to styrenated phenolic compositions, which may render them unsuitable for certain applications, e.g., polymer or lubricant applications, in which color is an important criterion. Examples of such catalysts include, but are not limited to, boron trifluoride etherate and sulfuric acid. For example, boron trifluoride etherate catalyst is known to give a product with an American Public Health Association (APHA) color index value of more than 150. Color is generally less of a concern for lubricant applications than for polymer applications.

On the other hand, it has now surprisingly and unexpectedly been discovered that certain acid catalysts impart substantially no color. Thus, in another embodiment, particularly preferred for polymer applications, liquid styrenated phenolic compositions can be prepared having very low color, if desired. A typical preferred APHA value for the liquid styrenated phenolic compositions of the present invention is an APHA value of less than 150, preferably, an APHA value of less than 100 or less than 80. Examples of low color-producing catalysts in this context include, but are not limited to, sulfonic acids and cation exchange resins. The sulfonic acid may be of the formula:

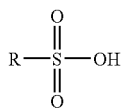

wherein R is selected from the group consisting of hydrogen, an alkyl group, such as, for example, a $C_1$-$C_8$ alkyl group (including but not limited to, methyl, ethyl, n-propyl, isopropyl, n-butyl, isobutyl, sec-butyl, tert-butyl, pentyl, hexyl, heptyl, and octyl) a halogen (i.e., F, Cl, Br, I or At), aryl (including but not limited to phenyl, benzyl, o-tolyl, m-tolyl, and p-tolyl), and haloalkyl (including but not limited to trichloromethyl and trifluoromethyl). Preferred sulfonic acids include, for example, methane sulfonic acid, ethane sulfonic acid, trichloromethane sulfonic acid and trifluoromethane sulfonic acid (triflic acid).

The amount of acid catalyst employed in the process will vary widely depending, for example, on the strength of the acid. If triflic acid is employed as the acid catalyst, it is preferably present in an amount ranging from 1 wppm to 1000 wppm, e.g., from 1 wppm to 500 wppm or from 1 wppm to 100 wppm, based on the total weight of the styrene, the phenolic and the catalyst added to the reaction vessel. Greater amounts, e.g., greater than 0.1 weight percent, greater than 1 weight percent, greater than 3 weight percent, or potentially much greater amounts of catalyst may be necessary for other catalysts, e.g., ion exchange resins or weaker acids.

Optionally, the catalyst employed includes a sulfonic acid catalyst, e.g., triflic acid, in combination with one or more phosphites. For example, molar ratios of sulfonic acid to phosphites may range, e.g., from 1 to 5 or from 1 to 100. Examples of phosphites that may be employed include trilauryl phosphite, diisodecyl phenyl phosphite, isodecyl diphenyl phosphite, triphenyl phosphite. Surprisingly high conversions, e.g., greater than 80 percent, greater than 90 percent or greater than 95 percent, may be achieved with catalyst systems employing sulfonic acid catalyst in combination with phosphites.

In some aspects, it may be necessary to remove the acid catalyst from the resulting styrenated phenolic product mixture, for example, by contacting the product mixture with a neutralization agent such as clay or soda ash. Preferably, however, the acid number of the initially formed styrenated phenolic product mixture is sufficiently low (e.g., less than 0.1 mg KOH/gram, as described below) that no catalyst removal or neutralization step is necessary. This is particularly true when very strong acids, e.g., triflic acid, are employed as the acid catalyst in very small amounts, as described above.

Novel Styrenated Phenolic Compositions

The above-described processes of the invention form novel styrenated phenolic compositions, which comprise a mixture of Mono, Di, and Tri styrenated phenolics. To achieve the desired liquid physical form and liquid lifetime, the Mono and Tri components should each be present at a level greater than 1% by total GC area, optionally no less than 2%, no less than 5% or no less than 10%, based on the total GC area of the product mixture (including peaks corresponding to unreacted styrene and phenolic). A typical Mono component level is in the range of greater than 1 to about 15%, e.g., from about 1 to about 10%, or from about 2 to about 5%, based on the total GC area of the product mixture. A typical level for the Tri component is from about 1 to about 15%, as well, e.g., from about 1 to about 10%, or from about 2 to about 5%, based on the total GC area of the product mixture. Preferably, the percentage of the combination of the Mono and Tri components will be in the range of from about 2 to about 30 percent based on the total GC area of the product mixture, e.g., from about 5 to about 30 percent, from about 5 to about 20% or from about 5 to about 10%, based on the total GC area of the product mixture.

As indicated above, the styrenated phenolic composition of the invention (optionally including a diluent, as described below) preferably is a liquid. More preferably, the composition (optionally with diluent) has a viscosity less than 40,000 cPs at 25° C., e.g., less than 30,000 cPs, less than 25,000 cPs or less than 15,000 cPs at 25° C. In terms of ranges, the styrenated phenolic composition, with or without diluent, may have a viscosity ranging from 1000 to 40,000 cPs, e.g., from 1,500 to 30,000 cPs or from 2,000 to 30,000 cPs, at 25° C. As used herein, unless otherwise indicated, the term "viscosity" refers to Brookfield viscosity at 25° C., as determined by ASTM-D-2393, the entirety of which is incorporated herein by reference.

Some conventional styrenated phenolic compositions tend to be solids or unstable slushy compositions containing precipitant. Movement and agitation of styrenated phenolic compositions may further increase precipitant formation. The styrenated phenolic compositions of the invention, in contrast, are non-slushy and preferably do not form any visible solids (precipitant) after 1 week, more preferably after 2 weeks, after 1 month, after 3 months, after 6 months or after 1 year when stored without substantial movement thereof and optionally under nitrogen atmosphere. These precipitation amounts are based on styrenated phenolic compositions at room temperature without substantial movement thereof, i.e., resting on in a storage container on a level surface for the relevant period, and preferably under nitrogen atmosphere.

Although acid catalysts preferably are employed in the processes of the invention, the resulting styrenated phenolic composition preferably has a low acid number since the presence of acid in the styrenated phenolic composition may undesirably encourage polymerization of the styrenated phenolic and decrease liquid lifetime. In some preferred embodiments, the styrenated phenolic composition has an acid number less than 0.5 mg KOH/gram, e.g., less than 0.2 mg KOH/gram, less than 0.1 mg KOH/gram, less than 0.05 mg KOH/ gram or less than 0.01 mg KOH/gram. As used herein, acid number is determined by titration with a KOH/methanol solution, where the titrant is dissolved in isopropyl alcohol. The acid number is the mg KOH required per gram of sample to achieve a neutral solution.

Diluent

Although the styrenated phenolic mixtures of the invention are liquids at room temperature even in the absence of any other components, their viscosity may be further reduced by adding a diluent thereto. Thus, in a preferred embodiment, a diluent is added to the above-described styrenated phenolic composition in order to further reduce its viscosity relative to the composition without diluent. Thus, the styrenated phenolic compositions of the present invention may or may not include a diluent. In a preferred embodiment, the invention is to a styrenated phenolic composition, comprising: at least one distyrenated phenolic (e.g., 2,6-distyrenated p-cresol), optionally in an amount from 70 to 98 percent by total Gas Chromatography area, at least one monostyrenated phenolic, optionally in an amount greater than 1 percent, e.g., greater than 5 percent, by total Gas Chromatography area, at least one tristyrenated phenolic, optionally in an amount greater than 1 percent, e.g., greater than 5 percent, by total Gas Chromatography area, and a diluent, optionally in an amount ranging from 0.5 to 20 weight percent, e.g., from 1 to 10 weight percent, from 3 to 7 weight percent or about 5 weight percent, based on the total weight of the styrenated phenolic species and the diluent.

Compositionally, the diluent may be any liquid miscible with the above-described styrenated phenolics that improves the handling properties of the composition, as indicated above. Exemplary diluent materials may include, for example, lubricating oils including base stocks obtained by isomerization of synthetic wax and wax, as well as hydrocracked base stocks produced by hydrocracking (rather than solvent extracting) the aromatic and polar components of crude oil. Other possible diluents include petroleum oils, mineral oils, and oils derived from coal or shale. Natural materials suitable for use as the diluent may include, for example, animal oils, such as lard oil, tallow oil, vegetable oils including canola oils, castor oils, linseed oils, and sunflower oils. In several preferred embodiments, the diluent comprises an epoxidized vegetable oil, such as, but not limited to, epoxidized canola oils, epoxidized castor oils, epoxidized linseed oils, and epoxidized sunflower oils. In a preferred aspect, the lubricating oil comprises a commercially available epoxidized soybean oil such as DRAPEX® 6.8 (Chemtura, Corp., Middlebury, Conn., USA).

The viscosity of the diluent similarly may vary widely, but preferably is no greater than 5,000, e.g., no greater than 1,000 cPs, no greater than 500 cPs, no greater than 400 cPs or no greater than 350 cPs. In terms of ranges, the diluent preferably has a viscosity ranging from 100 to 500 cPs, e.g., from 200 to 400 cPs or from 260 to 380 cPs, and most preferably about 320 cPs. The diluent preferably has a molecular weight of less than 10,000, e.g., less than 5,000, less than 2,500 or less than 1,500, and optionally ranges from 500 to 1500, e.g., from 750 to 1250, and most preferably is about 1000. Unless otherwise specified, molecular weights provided herein are determined through gel permeation chromatography using polystyrene standards.

Depending on its composition, the diluent may hydrolyze and/or polymerize slowly in the presence of acids, alkalis, water or water vapor. Thus, the diluent preferably has a low acid number, preferably less than 1.5, e.g., less than 1.0, and preferably about 0.5, as determined by AOCS-Te-2a, the entirety of which is incorporated herein by reference. The diluent also ideally has a very high degree of saturation (a low degree of unsaturation) and preferably has an iodine number (HANUS) less than 2.0, e.g., less than 1.8 or less than 1.5, as determined by AOCS-Tgl-64T, the entirety of which is incorporated herein by reference.

The amount of diluent added to the styrenated phenolic composition for handling purposes depends on factors such as the end use for the styrenated phenolic composition. In some preferred embodiments, the diluent is added to the styrenated phenolic composition in an amount less than 20 weight percent, e.g., less than 10 weight percent or less than 8 weight percent, based on the total weight of the styrenated phenolics and the diluent. In terms of ranges, the diluent optionally is added to the styrenated phenolics in an amount ranging from 0.5 to 20 weight percent, e.g., from 1 to 10 weight percent, from 3 to 7 weight percent, or about 5 weight percent, based on the total weight of the styrenated phenolics and the diluent.

Stabilization of Polymers

The invention further pertains to a stabilized thermoplastic or elastomeric resin, wherein one component comprises the styrenated phenolic composition and the other a thermoplastic and/or elastomeric polymer, such as a polyolefin, polyvinyl chloride, SBR, nitrile rubber, and the like.

Thermoplastic polymers that can be stabilized by the styrenated phenolic compositions of the present invention may be any thermoplastic known in the art, such as polyolefin homopolymers and copolymers, polyesters, polyurethanes, polyalkylene terephthalates, polysulfones, polyimides, polyphenylene ethers, styrenic polymers and copolymers, polycarbonates, acrylic polymers, polyamides, polyacetals and halide-containing polymers. Mixtures of different polymers, such as polyphenylene ether/styrenic resin blends, polyvinyl chloride/ABS or other impact modified polymers, such as methacrylonitrile and alpha-methylstyrene containing ABS, and polyester/ABS or polycarbonate/ABS and polyester plus some other impact modifier may also be used. Such polymers are available commercially or may be made by means well known in the art. The stabilizers of the invention are particularly useful in polyolefins, polyurethanes, and halide-containing polymers.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Halogen-containing polymers, e.g., PVC, may also be useful. As employed herein, the terms "poly(vinyl chloride)" and "PVC" are intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The terms "poly(vinyl chloride)" and "PVC" as employed herein are also intended to include graft polymers of PVC with EVA, ABS, and MBS. Preferred substrates are also mixtures of the above-mentioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM, and polylactones.

Vinyl acetate, vinylidene dichloride, acrylonitrile, chlorofluoroethylene and/or the esters of acrylic, fumaric, maleic and/or itaconic acids may be mentioned as preferred examples of monomers that are copolymerizable with vinyl chloride. In addition, polyvinyl chloride can be chlorinated having a chlorine content of up to 70% by weight. This invention applies particularly to the vinyl chloride homopolymers.

Within the scope of this invention, PVC will also be understood to include recyclates of halogen-containing polymers that have suffered damage by processing, use or storage. The polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene.

Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/-butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Other useful polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4 trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Representative examples of suitable elastomeric polymers include solution styrene-butadiene rubber (SSBR), styrene-butadiene rubber (SBR), natural rubber (NR), polybutadiene (BR), ethylene-propylene co- and terpolymers (EP, EPDM), and acrylonitrile-butadiene rubber (NBR). The rubber composition is comprised of at least one diene-based elastomer, or rubber. Suitable conjugated dienes are isoprene and 1,3-butadiene and suitable vinyl aromatic compounds are styrene and α-methyl styrene. Thus, the rubber is a sulfur curable rubber. Such diene-based elastomer, or rubber, may be selected, for example, from at least one of cis-1,4-polyisoprene rubber (natural and/or synthetic, and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35 percent to 50 percent vinyl), high vinyl polybutadiene rubber (50 percent to 75 percent vinyl), styrene/isoprene copolymers, emulsion polymerization prepared styrene/butadiene/acrylonitrile terpolymer rubber and butadiene/acrylonitrile copolymer rubber. An emulsion polymerization derived styrene/butadiene (e-SBR) might be used having a relatively conventional styrene content of 20 percent to 28 percent bound styrene or, for some applications, an e-SBR having a medium to relatively high bound styrene content, namely, a bound styrene content of 30 percent to 45 percent. Emulsion polymerization prepared styrene/butadiene/acrylonitrile terpolymer rubbers containing 2 to 40 weight percent bound acrylonitrile in the terpolymer are also contemplated as diene-based rubbers for use in this invention.

The solution polymerization prepared SBR (S-SBR) typically has a bound styrene content in a range of 5 to 50 percent, preferably 9 to 36 percent. Polybutadiene elastomer may be conveniently characterized, for example, by having at least a 90 weight percent cis-1,4-content.

Whichever polymer or polymers are employed, the one or more polymers preferably comprise a stabilizing amount of the styrenated phenolic composition of the present invention. As used herein, by "stabilizing amount" or an "effective amount" of the styrenated phenolic composition of the invention is meant when the polymer composition containing such styrenated phenolic composition shows improved stability in any of its physical or color properties in comparison to an analogous polymer composition which does not include the styrenated phenolic composition.

Examples of improved stability include improved stabilization against, for example, molecular weight degradation, color degradation, and the like from, for example, melt processing, weathering, and/or long term field exposure to heat, light, and/or other elements. In one example, an improved stability is meant one or both of lower initial color or additional resistance to weathering, as measured, for example, by initial yellowness index (YI), or by resistance to yellowing and change in color, when compared to a composition without the stabilizer additive.

Although the desired stabilizing amount of the styrenated phenolic composition will vary widely depending on the polymer employed and the intended use for the polymer article at issue, in some exemplary embodiments, the styrenated phenolic composition is present in the polymer in an amount less than 5 weight percent, e.g., less than 1 weight percent, less than 1000 wppm, less than 500 wppm or less than 100 wppm, based on the total weight of the polymer and the styrenated phenolic composition. In terms of ranges, the styrenated phenolic composition may be present in the polymer in an amount from 10 wppm to 5 weight percent, e.g., from 100 wppm to 1 weight percent, from 100 to 5000 wppm, or from 150 wppm to 1000 wppm, based on the total weight of the polymer and the styrenated phenolic composition.

Stabilization of Lubricants

In addition to polymer applications, the styrenated phenolic compositions of the invention are also useful for the stabilization of lubricants, such as lubricating oil base stocks. Thus, in one embodiment, the invention is to a lubricant composition, comprising a lubricant base stock, preferably in an amount greater than 90 weight percent, e.g., greater than 95 weight percent or greater than 99 weight percent, based on the weight of the lubricant composition; and a styrenated phenolic composition, preferably in an amount greater than 0.05 weight percent, e.g., greater than 0.5 weight percent or greater than 1 weight percent, based on the weight of the lubricant composition. In terms of ranges, the lubricant composition preferably comprises the styrenated phenolic composition in an amount from 0.05 to 10 weight percent, e.g., in an amount from 0.1 to 5 weight percent, or in an amount from 0.5 to 1 weight percent, based on the weight of the lubricant composition. As described above, the styrenated phenolic composition preferably comprises the distyrenated phenolic (e.g., 2,6-distyrenated p-cresol) in an amount from about 70 to 98%, e.g., from 80 to 95%, from 80 to 92%, from 80 to 85%, from 85 to 95% or from 90 to 95%, by total Gas Chromatography area, monostyrenated phenolic in an amount greater than 1 percent, e.g., greater than 5 percent, by total Gas Chromatography area, and tristyrenated phenolic in an amount greater than 1 percent, e.g., greater than 5 percent, by total Gas Chromatography area. The styrenated phenolic composition optionally further comprises a diluent, as described above.

The lubricating oil base stock may be any natural or synthetic lubricating oil base stock fraction having a kinematic viscosity at 100° C. of about 2 to about 200 cSt, more preferably about 3 to about 150 cSt, and most preferably about 3 to about 100 cSt. The lubricating oil base stock can be derived, for example, from natural lubricating oils, synthetic lubricating oils, or mixtures thereof. Suitable lubricating oil base stocks include base stocks obtained by isomerization of synthetic wax and wax, as well as hydrocracked base stocks produced by hydrocracking (rather than solvent extracting) the aromatic and polar components of the crude oil. Natural lubricating oils include animal oils, such as lard oil, tallow oil, vegetable oils including canola oils, castor oils, linseed oils, and sunflower oils, for example, petroleum oils, mineral oils, and oils derived from coal or shale. In several preferred embodiments, the lubricating oil is an epoxidized vegetable oil, such as, but not limited to, epoxidized canola oils, epoxidized castor oils, epoxidized linseed oils, and epoxidized sunflower oils (e.g., DRAPEX® 6.8, Chemtura Corporation, Middlebury, Conn., USA).

Synthetic oils include hydrocarbon oils and halo-substituted hydrocarbon oils, such as polymerized and interpolymerized olefins, gas-to-liquids prepared by Fischer-Tropsch technology, alkylbenzenes, polyphenyls, alkylated diphenyl ethers, alkylated diphenyl sulfides, as well as their derivatives, analogs, homologs, and the like. Synthetic lubricating oils also include alkylene oxide polymers, interpolymers, copolymers, and derivatives thereof, wherein the terminal hydroxyl groups have been modified by esterification, and etherification, for example.

Another suitable class of synthetic lubricating oils comprises the esters of dicarboxylic acids with a variety of alcohols. Esters useful as synthetic oils also include those made from $C_5$ to $C_{18}$ monocarboxylic acids and polyols and polyol ethers. Other esters useful as synthetic oils include those made from copolymers of α-olefins and dicarboxylic acids which are esterified with short or medium chain length alcohols.

Silicon-based oils, such as the polyalkyl-, polyaryl-, polyalkoxy-, or polyaryloxy-siloxane oils and silicate oils, comprise another useful class of synthetic lubricating oils. Other synthetic lubricating oils include liquid esters of phosphorus-containing acids, polymeric tetrahydrofurans, poly α-olefins, and the like.

The lubricating oil may be derived from unrefined, refined, re-refined oils, or mixtures thereof. Unrefined oils are obtained directly from a natural source or synthetic source (e.g., coal, shale, or tar and bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to unrefined oils, except that refined oils have been treated in one or more purification steps to improve one or more properties. Suitable purification techniques can include distillation, hydrotreating, dewaxing, solvent extraction, acid or base extraction, filtration, percolation, and the like, all of which are well-known to those skilled in the art. Re-refined oils are obtained by treating refined oils in processes similar to those used to obtain the refined oils. These re-refined oils are also known as reclaimed or reprocessed oils and often are additionally processed by techniques for removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over a hydroisomerization catalyst. Natural waxes are typically the slack waxes recovered by the solvent dewaxing of mineral oils; synthetic waxes are typically the wax produced by the Fischer-Tropsch process. The resulting isomerate product is typically subjected to solvent dewaxing and fractionation to recover various fractions having a specific viscosity range. Wax isomerate is also characterized by possessing very high viscosity indices (VI), generally having a VI of at least 130, preferably at least 135 or higher as determined by ASTM D-2270, the entirety of which is incorporated herein by reference, and, following dewaxing, a pour point of about −20° C. or lower.

The lubricating oil used in the practice of the present disclosure can be selected from any of the base oils in Groups I-V as broadly specified in the American Petroleum Institute (API) Base Oil Interchangeability Guidelines. The five base oil groups are described in Table 1.

TABLE 1

| API Base Oil Category | | | |
|---|---|---|---|
| Category | Sulfur (%) | Saturates (%) | Viscosity Index |
| Group I | >0.03 and/or | <90 | 80 to 120 |
| Group II | ≦0.03 and | ≧90 | 80 to 120 |
| Group III | ≦0.03 and | ≧90 | ≧120 |
| Group IV | All polyalphaolefins (PAOs) | | |
| Group V | All others not included in Groups I, II, III or IV | | |

The styrenated phenolic compositions of the present disclosure are especially useful as components in many different lubricating oil compositions. The additives can be included in a variety of oils with lubricating viscosity, including natural and synthetic lubricating oils and mixtures thereof. The additives can be included in crankcase lubricating oils for spark-ignited and compression-ignited internal combustion engines. The compositions can also be used in gas engine lubricants, steam and gas turbine lubricants, automatic transmission fluids, gear lubricants, compressor lubricants, metal-working lubricants, hydraulic fluids, and other lubricating oil and grease compositions.

Although the desired stabilizing amount of the styrenated phenolic composition in the lubricant composition will vary widely depending on the lubricating base stock employed and the intended use for the lubricant composition at issue, in some exemplary embodiments, the styrenated phenolic composition is present in the lubricant composition in an amount less than 10 weight percent, e.g., less than 1 weight percent, less than 0.5 weight percent, or less than 0.1 weight percent, based on the total weight of the lubricant base stock and the styrenated phenolic composition. In terms of ranges, the styrenated phenolic composition may be present in the lubricant base stock in an amount from 0.01 to 10 weight percent, e.g., from 0.1 to 5 weight percent or from 0.1 to 2 weight percent, based on the total weight of the lubricant base stock and the styrenated phenolic composition.

When blended into a lubricant base stock, the resulting lubricating composition preferably has a high degree of oxidative stability. Oxidative stability may be quantified by pressure differential scanning calorimetry (PDSC). PDSC examines an oil's oxidative stability under thin-film oxidation conditions. In the isothermal mode where PDSC temperature is maintained at a predetermined value, a test oil's oxidation stability is ranked according to the oxidation induction time (OIT), corresponding to an exothermic release of heat caused by the onset of oxidation of the oil. Oil giving longer OIT is generally considered more resistant to oxidation. To expedite the PDSC testing process, each test oil was pre-treated with 50 ppm of oil soluble iron derived from ferric naphthenate. Preferably, the lubricant compositions of the invention have a 160° C. PDSC OIT that is greater than 20 min., e.g., greater than 30 min., greater than 40 min., greater than 50 min., or greater than 55 min. The lubricant optionally has a 185° C. PDSC OIT that is greater than 2 min., e.g., greater than 5 min., greater than 8 min., or greater than 10 min. Oxidative stability also may be quantified by rotary pressure vessel oxidative test (RPVOT) according to ASTM D2272, the entirety of which is incorporated herein by reference. In some preferred embodiments, the lubricant composition has an RPVOT OIT greater than 100 min., e.g., greater than 200 min., or greater than 300 min.

The lubricant compositions of the invention also preferably have a reduced tendency to form deposits than an analogous lubricant composition without the styrenated phenolic compositions of the present invention. Deposit formation may be quantified, for example, by a Thermo-oxidation Engine Oil Simulation Test (TEOST) at moderately high temperature (MHT) according to ASTM D7097, the entirety of which is incorporated herein by reference. The TEOST simulates the effect of engine operating conditions on the oxidation and deposit-forming tendencies of lubricant compositions. In some exemplary embodiments, the lubricant compositions of the invention provide TEOST MHT values less than 100 mg, e.g., less than 75 mg, less than 60 mg, or less than 55 mg.

Co-Stabilizers and Additives

The invention further relates to a stabilized thermoplastics and/or elastomeric resins and/or lubricant compositions, where one component comprises the styrenated phenolic composition of the invention and the other a polymer or lubricant base stock such as those described above, and where the styrenated phenolic composition is used with a co-stabilizer, for example, phenolics, aromatic amines, phosphites and phosphonites, hydroxylamines, alkylamine-N-oxides, lactones, thioethers, epoxidized vegetable oils, e.g., epoxidized soybean oil, and the like.

Thus, the thermoplastic resins and lubricants stabilized by the styrenated phenolic composition of the present invention may optionally contain an additional stabilizer or mixture of stabilizers selected from the group consisting of the phenolic antioxidants, hindered amine stabilizers, the ultraviolet light absorbers, phosphites, phosphonites, alkaline metal salts of fatty acids, the hydrotalcites, metal oxides, epoxydized soybean oils, the hydroxylamines, the tertiary amine oxides, lactones, thermal reaction products of tertiary amine oxides, and the thiosynergists. Phenolics, diaryl amines, and organophosphites are particularly preferred.

Phenolics that can be employed as optional co-stabilizers in the practice of the present invention include, but are not limited to:

1. Alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6 dimethylphenol, 2,6-di-octadecyl-4-methylphenol, 2,4,6,-tricyclohexyphenol, 2,6-di-tert-butyl-4-methoxymethylphenol.

2. Alkylated hydroquinones, for example, 2,6-di-tert-butyl-4-methoxyphenol, 2,5-di-tert-butyl-hydroquinone, 2,5-di-tert-amylhydroquinone, 2,6-diphenyl-4-octadecyloxyphenol.

3. Hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), 4,4'-thio-bis-(6-tert-butyl-2-methylphenol).

4. Alkylidene-bisphenols, for example, 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl(phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-(α-methylbenzyl)-4-nonylphenol), 2,2'-methylene-bis-(6-(α,α-dimethylbenzyl)-4-nonyl-phenol), 2,2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylphenyl)-dicyclopentadiene, di-(2-(3'-tert-butyl-2'hydroxy-5'methylbenzyl)-6-tert-butyl-4-methylphenyl)terephthalate, and other phenolics such as mono-acrylate esters of bisphenols such as ethylidiene bis-2,4-di-t-butyl phenol monoacrylate ester.

5. Benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercaptoacetate, bis-(4-tert-butyl-3-hydroxy-2,6-dimethylbenzyl)dithiol-terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl) isocyanurate, dioctadecyl 3,5-di-tert-butyl-4-hydroxybenzyl-phosphonate, calcium salt of monoethyl 3,5-di-tert-butyl-4-hydroxybenzylphosphonate, 1,3,5-tris-(3,5-dicyclohexyl-4-hydroxybenzyl)isocyanurate.

6. Acylaminophenols, for example, 4-hydroxy-lauric acid anilide, 4-hydroxy-stearic acid anilide, 2,4-bis-octylmercapto-6-(3,5-tert-butyl-4-hydroxyanilino)-s-triazine, octyl-N-(3,5-di-tert-butyl-4-hydroxyphenyl)carbamate.

7. Esters of β-(3,5-di-tert-butyl-4-hydroxyphenol)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, di-hydroxyethyl oxalic acid diamide.

8. Esters of β-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thidiethyleneglycol, dihydroxyethyl oxalic acid diamide.

9. Esters of β-(5-tert-butyl-4-hydroxy-3-methylphenyl) propionic acid with mono- or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide.

10. Amides of β-(3,5-di-tert-butyl-4-hydroxyphenol)-propionic acid for example, N,N'-di-(3,5-di-tert-butyl-4-hydroxyphenylpropionyl)-hexamethylen-diamine, N,N'-di-(3,5-di-tert-butyl-4-hydroxyphenylpropionyl)trimethylenediamine, N,N'-di-(3,5-di-tert-butyl-4-hydroxyphenylpropionyl)-hydrazine.

Aromatic amines that are useful as co-stabilizers in the practice of the present invention can be represented by the general formula

where $R_1$ and $R_2$ may be, but are not necessarily, identical. Thus, in a preferred embodiment, $R_1$ and $R_2$ can be independently selected from the group consisting of (i) aromatic carbon, (ii) aliphatic $R_1$ and aromatic $R_2$ carbon atoms, and (iii) aromatic carbon linked to a second nitrogen atom to give a phenylene diamine.

Where $R_1$ is aliphatic, it can be straight chain or branched and can have from one to twelve carbon atoms, e.g., methyl, ethyl, propyl, butyl, pentyl, hexyl, heptyl, octyl, nonyl, decyl, undecyl, dodecyl, and isomers thereof. It is preferred that, where $R_1$ is aliphatic, it be a straight or branched chain aliphatic group having from one to eight carbon atoms, and more preferred that it have from one to four carbon atoms.

The amine antioxidants can be hydrocarbon substituted diarylamines, such as, aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamido)-diphenylamine, i.e.,

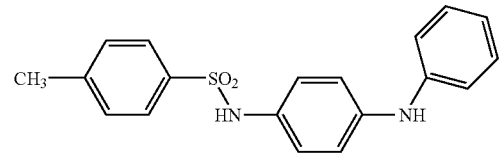

are also considered as part of this class.

Hydrocarbon-substituted diarylamines that are useful in the practice of this invention can be represented by the general formula

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

In one embodiment, particularly preferred for lubricant applications, the co-stabilizer comprises at least one antioxidant comprising one or more secondary diarylamines having the general formula:

wherein $Ar_1$ and $Ar_2$ are independent and comprise aromatic hydrocarbons, $R_4$ and $R_5$ are independent and comprise hydrogen and hydrocarbyl groups and a and b are independent and 0 to 3, provided that (a+b) is not greater than 4. As described in U.S. patent application Ser. No. 11/825,449, filed Jul. 6, 2007, the entirety of which is incorporated herein by reference, coupling the styrenated phenolic compositions of the invention and the aforementioned secondary diarylamines, particularly in lubricant applications, results in synergistic antioxidant action. In this aspect, the oxidation stability of a lubricating oil comprising one or more Group I, Group II, Group III, Group IV or synthetic lubricating base stocks of varying viscosity grades may be increased by adding thereto: (i) the styrenated phenolic composition of the invention (e.g., in an amount from about 0.01 to about 10 weight percent, based on the total weight of the lubricant including antioxidants) and (ii) one or more diarylamines of the above structure (e.g., in an amount from about 0.01 to about 10 weight percent, based on the total weight of the lubricant composition including antioxidants). The content ratio of the styrenated phenolic to the secondary diarylamine can be in practically all proportions. In illustrative embodiments, the ratio will be in the range of 1:99 to 00:1 parts by weight and more preferably, 90:10 to 10:90 parts by weight.

Preferred hydrocarbon-substituted diarylamines are those disclosed in U.S. Pat. Nos. 3,452,056 and 3,505,225, the entire disclosures of which are incorporated by reference herein. The preferred hydrocarbon-substituted diarylamines can be represented by the following general formulas:

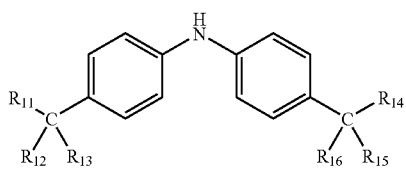

(I)

where $R_{11}$ is selected from the group consisting of phenyl and p-tolyl radicals;

$R_{12}$ and $R_{13}$ are independently selected from the group consisting of methyl, phenyl, and p-tolyl radicals;

$R_{14}$ is selected from the group consisting of methyl, phenyl, p-tolyl, and neopentyl radicals;

$R_{15}$ is selected from the group consisting of methyl, phenyl, p-tolyl, and 2-phenylisobutyl radicals; and, $R_{16}$ is a methyl radical.

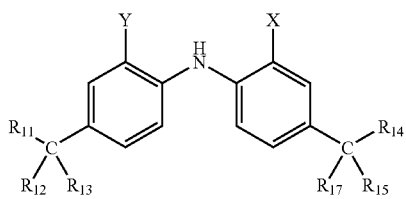

(II)

where $R_{11}$ through $R_{15}$ are independently selected from the radicals shown in Formula I and $R_{17}$ is selected from the group consisting of methyl, phenyl, and p-tolyl radicals;

X is a radical selected from the group consisting of methyl, ethyl, $C_3$-$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$-$C_{10}$ sec-alkyl, chlorine, and bromine.

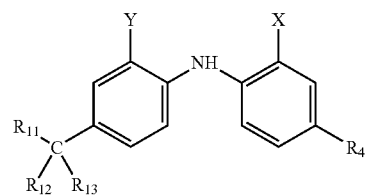

(III)

where $R_{11}$ is selected from the group consisting of phenyl or p-tolyl radicals;

$R_{12}$ and $R_{13}$ are independently selected from the group consisting of methyl, phenyl, and p-tolyl radicals;

$R_{14}$ is a radical selected from the group consisting of hydrogen, $C_3$-$C_{10}$ primary, secondary, and tertiary alkyl, and $C_3$-$C_{10}$ alkoxyl, which may be straight chain or branched; and X and Y are radicals selected from the group consisting of hydrogen, methyl, ethyl, $C_3$-$C_{10}$ sec-alkyl, chlorine, and bromine.

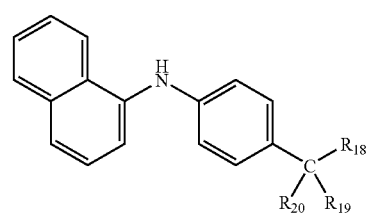

(IV)

where $R_{18}$ is selected from the group consisting of phenyl and p-tolyl radicals;

$R_{19}$ is a radical selected from the group consisting of methyl, phenyl, p-tolyl and 2-phenyl isobutyl; and $R_{20}$ is a radical selected from the group consisting of methyl, phenyl, and p-tolyl.

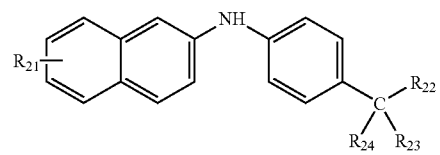

(V)

where $R_{21}$ is selected from the group consisting of hydrogen, α,α-dimethylbenzyl, α-methylbenzhydryl, triphenylmethyl, and α,αp-trimethylbenzyl radicals;

$R_{22}$ is selected from the group consisting of phenyl or p-tolyl radicals;

$R_{23}$ is selected from the group consisting of methyl, phenyl, and p-tolyl radicals; and $R_{24}$ is selected from the group consisting of methyl, phenyl, p-tolyl, and 2-phenylisobutyl radicals.

Additional co-stabilizers useful in combination with the styrenated phenolic compositions of the invention for stabilization of polymers and lubricants are as follows:

TYPE I

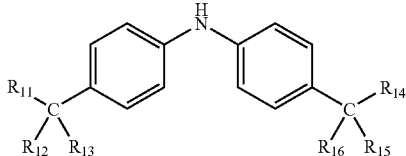

| $R_{11}$ | $R_{12}$ | $R_{13}$ | $R_{14}$ | $R_{15}$ | $R_{16}$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

TYPE II

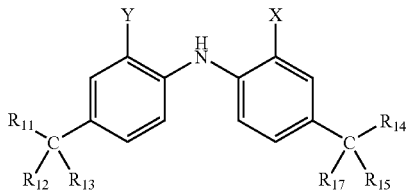

| $R_{11}$ | $R_{12}$ | $R_{13}$ | $R_{14}$ | $R_{15}$ | $R_{17}$ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

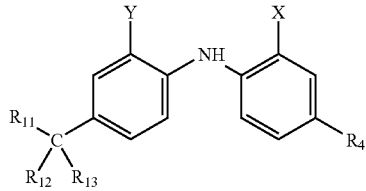

| $R_{11}$ | $R_{12}$ | $R_{13}$ | $R_{14}$ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

A second class of amine antioxidants comprises the reaction products of a diarylamine and an aliphatic ketone. The diarylamine aliphatic ketone reaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either aryl group, with an aliphatic ketone, preferably acetone, in the presence of a suitable catalyst. In addition to diphenylamine, other suitable diarylamine reactants include dinaphthyl amines; p-nitrodiphenylamine; 2,4-dinitrodiphenylamine; p-aminodiphenylamine; p-hydroxydiphenylamine; and the like. In addition to acetone, other useful ketone reactants include methylethylketone, diethylketone, monochloroacetone, dichloroacetone, and the like.

A preferred diarylamine-aliphatic ketone reaction product is obtained from the condensation reaction of diphenylamine and acetone (NAUGARD A, Chemtura Corporation), for example, in accordance with the conditions described in U.S. Pat. No. 2,562,802. The commercial product is supplied as a light tan-green powder or as greenish brown flakes and has a melting range of 85° C. to 95° C.

A third class of suitable amines comprises the N,N'hydrocarbon substituted p-phenylene diamines. The hydrocarbon substituent may be alkyl or aryl groups, which can be substituted or unsubstituted. As used herein, the term "alkyl," unless specifically described otherwise, is intended to include cycloalkyl. Representative materials are:

N-phenyl-N'-cyclohexyl-p-phenylenediamine;
N-phenyl-N'-sec-butyl-p-phenylenediamine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N=-diphenyl-p-phenylenediamine;
N,N'-di-beta naphthyl-p-phenylenediamine; mixed diaryl-p-N,N'-bis-(1-ethyl-3-methylpentyl)-p-phenylenediamines; and
N,N'-bis-(1 methylheptyl)-p-phenylenediamine.

A fourth class of amine antioxidants comprises materials based on quinoline, especially, polymerized 1,2-dihydro-2,2,4-trimethylquinoline (Naugard Super Q, Chemtura Corporation). Representative materials also include 6-dodecyl-2,2,4-trimethyl-1,2-dihydroquinoline; 6-ethoxy-2,2,4-trimethyl-1-2-dihydroquinoline, and the like.

Secondary amines that are especially preferred for use in the practice of the present invention are 4,4'-bis(α,αdimethylbenzyl)diphenylamine (Naugard 445, Chemtura Corporation), octylated diphenylamine (Naugard Octamine, Chemtura Corporation), polymerized 1,2-dihydro-2,2,4-trimethylquinoline (Naugard Super Q, Chemtura Corporation) and p-(p-toluene-sulfonylamido)-diphenyl amine (Naugard SA, Chemtura Corporation).

Phosphites and phosphonites useful as co-stabilizers in the practice of the present invention include, for example, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, and tetrakis(2,4-di-tert-butylphenyl)-4,4'-biphenylene diphosphonite.

Lactones that can be employed as co-stabilizers in the practice of the present invention include those of the structure:

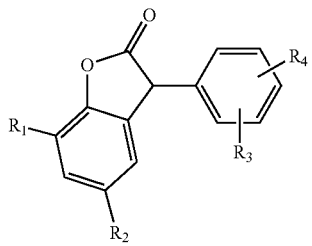

wherein $R_1$ and $R_2$ are independently selected from the group consisting of hydrogen; chloro; hydroxy; $C_1$-$C_{25}$ alkyl; $C_7$-$C_9$-phenylalkyl; unsubstituted or $C_1$-$C_4$ alkyl-substituted phenyl; unsubstituted or $C_1$-$C_4$ alkyl-substituted $C_5$-$C_8$ cycloalkyl; $C_1$-$C_{18}$ alkoxy; $C_1$-$C_{18}$ alkylthio; $C_1$-$C_4$ alkylamino; di-($C_1$-$C_4$ alkyl)amino; $C_1$-$C_{25}$ alkanoyloxy; $C_1$-$C_{25}$ alkanoylamino; $C_3$-$C_{25}$ alkenoyloxy; $C_3$-$C_{25}$ alkanoyloxy which is interrupted by oxygen, sulfur, or >N—$R_8$; $C_6$-$C_9$ cycloalkylcarbonyloxy; benzoyloxy or $C_1$-$C_{12}$ alkyl-substituted benzoyloxy;

$R_8$ is hydrogen or $C_1$-$C_8$ alkyl; and $R_3$ and $R_4$ are independently selected from the group consisting of hydrogen, $C_1$-$C_8$ alkyl, $C_1$-$C_4$ alkoxy, halogen, a group

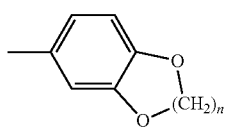

in which n is 1 or 2, or a group

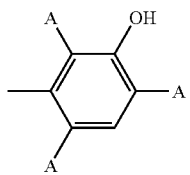

in which the radicals A are independently selected from the group consisting of $C_1$-$C_8$ alkyl and $C_1$-$C_8$ alkoxy.

One useful representative of these lactones is 5,7-di-t-butyl-3-(3,4,-dimethylphenyl)-3H-benzofuran-2-one, which is of the structure

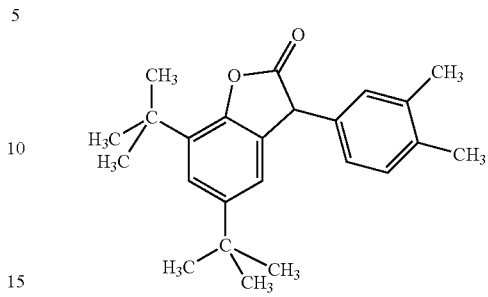

This compound is commercially available from Ciba Specialties as HP 136.

Thioethers that are useful as co-stabilizers in the practice of the present invention can be of the structure:

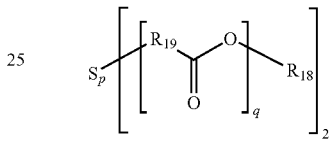

where p is 1 or 2, q is 0 or 1, and p+q=2, $R_{18}$ is a straight or branched chain alkyl moiety of 1 to 20 carbon atoms, and $R_{19}$ is a straight or branched chain alkylene moiety of 1 to 8 carbon atoms. Thus, $R_{18}$ can, for example, be methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof, and $R_{19}$ can, for example, be methylene, ethylene, propylene, butylene, pentylene, hexylene, heptylene, octylene, and isomers thereof. It is preferred that $R_{18}$ be a straight or branched chain alkyl moiety of 8 to 18 carbon atoms and that $R_{19}$ be a straight or branched chain alkylene moiety of 1 to 4 carbon atoms. It is more preferred that $R_{19}$ be ethylene, i.e., —$CH_2$—$CH_2$—.

Other thioethers that are useful in the practice of the present invention can be of the structure:

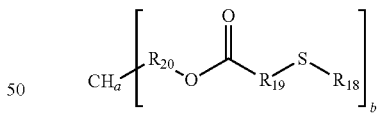

where a is 0 to 3, b is 1 to 4, and a+b=4, $R_{18}$ is as described above, and $R_{19}$ and $R_{20}$ are independently selected straight or branched chain alkylene moieties of 1 to 8 carbon atoms. It is preferred that $R_{19}$ and $R_{20}$ be independently selected straight or branched chain alkylene moieties of 1 to 4 carbon atoms. It is more preferred that $R_{20}$ be methylene, i.e., —$CH_2$—, and that $R_{19}$ be ethylene, i.e., —$CH_2$—$CH_2$—.

Preferred thioethers that are useful in the practice of the present invention are exemplified by products such as distearylthiodipropionate (Naugard DSTDP, Chemtura Corporation), dilaurylthiodipropionate (Naugard DLTDP, Chemtura Corporation), pentaerythritol tetrakis(β-laurylthiopropionate) (Naugard 412S, Chemtura Corporation), and pentaerythritol octylthiopropionate (Naugard 2140, Chemtura Corporation).

The optional co-stabilizer of the present invention can also be a trialkyl amine oxide, as, for example, GENOX™ EP (commercially available from Chemtura Corporation) and described in U.S. Pat. Nos. 6,103,798; 5,922,794; 5,880,191; and 5,844,029, the entireties of which are incorporated herein by reference.

Another co-stabilizer may be a hydroxylamine, as, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-didecylhydroxylamine, N,N-di(coco alkyl)hydroxylamine, N,N-di($C_{20}$-$C_{22}$ alkyl)hydroxylamine, and N,N-dialkylhydroxylamine derived from hydrogenated tallow amine (i.e., N,N-di(tallow alkyl)hydroxylamine), as well as mixtures containing any of the foregoing.

The co-stabilizers described herein for combination with the styrenated phenolic compositions of the invention preferably are present in an amount effective to improve composition stability. When one of the aforementioned co-stabilizers is utilized, the amount is generally less than about 5 weight percent based on the total weight of the resin or lubricant and is preferably at least about 50 ppm based on the weight of the resin or lubricant. The stabilizer combinations of this invention stabilize resins and lubricants especially during high temperature processing or high temperature applications with relatively little change in melt index and/or color, even though, for polymer applications, the polymer may undergo a number of extrusions. The instant stabilizers may readily be incorporated into the resins by conventional techniques, at any convenient stage prior to the manufacture of shaped articles therefrom. The stabilized compositions of the invention may optionally contain from about 0.001 to about 5%, preferably from about 0.0025 to about 2%, and especially from about 0.005% to about 1%, by weight of various conventional additives, such as those described previously, or mixtures thereof.

EXAMPLES

The present invention will be better understood in view of the following non-limiting Examples.

Fog data were gathered by performing a test designated as Windscreen Fogging Characteristics of Trim Materials in Motor Vehicles on suitable polyurethane foam test specimens. The test method is also known as DIN 75 201 Method B. Di-isodecylphthalate (DIDP) was used as reference. Typically, the test calls for exposing test specimens at 100° C. for 16 hours.

Surprisingly, it has been found that the styrenated phenolic compositions (e.g., styrenated p-cresol compositions) of the present invention incorporate two key features when used in polyurethane-type foam formulations: (1) it acts as a low fog additive, while (2) also imparting good stabilization. As employed herein, the term "low fog" is defined as a fog deposit after heating for 160 hours at 100° C. in the range of from about 0.01 to about 0.4 mg, preferably from about 0.02 to about 0.1 mg.

The reasons for aforementioned surprise element are as follows: neat styrenated p-cresol compositional volatility was in line with its molar mass (MM); and a rule of thumb in the art holds that the lower the molar mass of a molecule, the higher is its volatility.

Thus, neat 2,6-distyryl-p-cresol (MM=316) is less volatile than neat 2,6-di tert-butyl-p-cresol (MM=220). At the same time, as suggested by their respective molar mass, 2,6-distyryl-p-cresol is more volatile than octadecyl 3,5-di-t-butyl-4-hydroxyhydrocinnamate (MM=531).

However, in polyurethane-type foam products the rule of thumb does not hold true. Thus, a formulation containing 2,6-distyryl-p-cresol gave much lower fog (i.e. volatility) than a corresponding formulation containing the higher molar mass additive, octadecyl 3,5-di-t-butyl-4-hydroxyhydrocinnamate.

Polyurethane type foam test specimens were prepared using the recipe below:

TABLE 2

| Material | Weight Percent |
| --- | --- |
| Polyol (Bayer LG56, 56 OH Index) | 100.0 |
| H$_2$O | 4.4 |
| Dabco 8264 (Amine Catalyst) | 0.5 |
| L-620 (Silicone Surfactant) | 1.0 |
| Kosmos 29 (Tin Catalyst) | 0.28 |
| TDI (110 Index) | 56.77 |
| Antioxidant | 0.5 |

Differential Scanning Calorimetry (DSC) analysis was performed on a Mettler Toledo instrument. Oxidation Induction Temperature (OIT) was recorded as onset temperature on heating test specimens, under oxygen, from 30-300° C. using a heating rate of 8° C./min.

Example 1

Synthesis of 2,6-Distyryl-p-cresol

To a one liter round-bottomed flask equipped with a stirrer, thermometer, and addition funnel was charged 151.3 grams (1.4 moles) of p-cresol. The mixture was heated to 70° C., followed by the addition of 5 μL of trifluoromethane sulfonic acid via a 100 μL syringe. Under a nitrogen blanket, 284.5 grams (2.73 moles) of styrene was placed into the funnel and then added dropwise, with stirring, over a period of three hours. During styrene addition, the pot temperature did not exceed 80° C. Stirring was continued at a pot temperature of 70° C. for a period of 1.5 hours after all the styrene had been added. The resultant styrenated p-cresol composition analyzed as follows:

TABLE 3

| Gas Chromatography (GC) RESULTS (Area %) | |
| --- | --- |
| Styrene | 0.13 |
| p-Cresol | 0.03 |
| Monostyrenated p-cresol | 7.23 |
| 2,6-Distyrenated p-cresol | 86.31 |
| Tristyrenated p-cresol | 4.75 |
| Total Area | 98.45 |

APHA value = 50
Acid Number = 0.01 mg KOH/g
Brookfield Viscosity = 29,900 cPs (25° C.)
Weight Yield = 94%

Example 2

This example illustrates the volatility of neat 2,6-distyryl-p-cresol, as measured by TGA. The TGA results data are summarized in Table 4. Unless otherwise indicated, thermogravimetric analysis (TGA) on neat materials was performed using a Mettler Universal V2.5H TA instrument. Weight loss was recording by isotherming the test specimens at 160° C. under nitrogen.

TABLE 4

TGA Volatility of Neat 2,6-Distyryl-p-Cresol

| Antioxidant (AO) | AO Molar Mass | Weight loss (%) after 1 hr. @ 160EC | Weight loss (%) after 4 hrs. @ 160° C. |
|---|---|---|---|
| 2,6-di-tert-butyl-p-cresol | 230 | 100 | n.d. |
| 2,6-di-tert-butyl-4-sec-butyl phenol | 262 | 99 | n.d. |
| 2,6-di-styryl-p-cresol | 316 | 40 | 94 |
| C13-15 alkyl 3,5-di-tert-butyl-4-hydroxyhydrocinnamate | 471* | 8 | 20 |
| octadecyl 3,5-di-tert-butyl-4-hydroxyhydrocinnamate | 531 | 0.5 | 2.5 |

*estimated

These results show that neat additive volatility, as measured by TGA, line up with additive molar mass.

Example 3

This example illustrates the volatiles emission from polyurethane foam additised with 2,6-distyryl-p-cresol, as measured by fog deposit. The fog test results data are summarized in Table 5.

TABLE 5

Fog Deposit of Polyurethane Foam Samples

| Antioxidant (AO) | AO Molar Mass | Fog deposit (mg) @ 160 hr./100° C. |
|---|---|---|
| None | | 0.04 |
| 2,6-di-tert-butyl-4-sec-butyl phenol | 262 | 0.71 |
| 2,6-di-styryl-p-cresol | 316 | 0.04 |
| C$_{13-15}$ alkyl 3,5-di-tert-butyl-4-hydroxyhydrocinnamate | 471* | 0.31 |
| octadecyl 3,5-di-tert-butyl-4-hydroxyhydrocinnamate | 531 | 0.35 |

*estimated

These results show a surprisingly low emission for polyurethane type foam samples additised with 2,6-distyryl-p-cresol. Thus, the total fog deposit value for a 2,6-distyryl-p-cresol formulation was comparable to the no-add control. In other words, fog deposit for this formulation was significantly lower than that of two control materials that each had a higher molar mass. Moreover, surprisingly, fog deposit did not line up with the order suggested by additive molar mass.

Example 4

This example illustrates the polyol stabilizer efficacy of 2,6-di-styryl-p-cresol, as measured by Oxidation Induction Temperature. The results data are summarized in Table 6.

TABLE 6

OIT Results for Polyol Stabilized with 2,6-Distyryl-p-Cresol

| Polyol LG 56 (Bayer) + AO (1000 ppm) | OIT (° C.) |
|---|---|
| 2,6-di-tert-butyl-p-cresol | 173 |
| 2,6-di-tert-butyl-4-sec-butyl phenol | 179 |

TABLE 6-continued

OIT Results for Polyol Stabilized with 2,6-Distyryl-p-Cresol

| Polyol LG 56 (Bayer) + AO (1000 ppm) | OIT (° C.) |
|---|---|
| 2,6-di-styryl-p-cresol | 177 |
| C$_{13-15}$ alkyl 3,5-di-tert-butyl-4-hydroxyhydrocinnamate | 176 |
| octadecyl 3,5-di-tert-butyl-4-hydroxyhydrocinnamate | 175 |

These results from this testing showed the good stabilizing properties of 2,6-distyryl-p-cresol for polyol formulations, as measured by OIT. Several phenolic antioxidant controls were used in this testing.

Example 5

Performance Evaluation of 2,6-distryrenated-p-cresol in LLDPE Retention of Melt Flow Index Upon Multipass Extrusion This example illustrates the stabilizer efficacy of 2,6-distyryl-p-cresol in the presence of a phosphite stabilizer, as compared to a control comprising a blend of octadecyl 3,5-di-t-butyl-4-hydroxyhydrocinnamate and a phosphite stabilizer.

The base polymer was a C4-copolymer linear low density polyethylene powder with a melt index (MI) of 1, having a density of 0.918 g/cm$^3$. The base formulation also contained 500 ppm of zinc stearate as an acid scavenger. All formulations were made up by adding tris nonylphenyl phosphite in combination with either 2,6-distyryl-p-cresol or octadecyl 3,5-di-t-butyl-4-hydroxyhydrocinnamate to the base formulation (see Table 7 for more details). The thus-stabilized resin formulation was then extruded from a 19 mm diameter Brabender single-screw extruder at 60 rpm, with the temperature set to 230EC. The first extrusion pass was performed under inert atmosphere. The extrudate was cooled by passing it through an ice water bath and then pelletized. These pellets were re-extruded, albeit under air, using the same RPM, temperature, and pelletizing conditions as before, for up to five additional passes. The results from this testing are shown in Table 7.

TABLE 7

MFI Results

| Stabilizer (ppm) | Extrusion Pass 1 MFI (g/10 min) @ 190/2.16 | Extrusion Pass 6 MFI (g/10 min) @ 190/2.16) |
|---|---|---|
| Control: octadecyl 3,5-di-t-butyl-4-hydroxyhydrocinnamate (200) + P1 (1200) | 0.98 | 0.66 |
| 2,6-distyryl-p-cresol (200) + P1 (1200) | 1.01 | 0.94 |

P1 is tris(nonylphenyl) phosphite

A relatively small decrease in melt flow index is indicative of superior stabilizer efficacy. Thus, the results from this testing show that 2,6-distyryl-p-cresol, in combination with phosphite PI, gave superior melt stabilization as compared to the control.

Example 6

This example illustrates the stabilizer efficacy of 2,6-distyryl-p-cresol, in the presence of a phosphite stabilizer, as determined by measuring retention of color. The result is compared to a control comprising a blend of octadecyl 3,5-di-t-butyl-4-hydroxyhydrocinnamate and the same phosphite stabilizer.

The base polymer was a C4-copolymer linear low density polyethylene powder with a melt index (MI) of 1, having a density of 0.918 g/cm$^3$. The base formulation also contained 500 ppm of zinc stearate as an acid scavenger. All formulations were made up by adding tris nonylphenyl phosphite in combination with either 2,6-distyryl-p-cresol or octadecyl 3,5-di-t-butyl-4-hydroxyhydrocinnamate to the base formulation (see Table 8 for additional details). The thus-stabilized resin formulation was then extruded from a 19 mm diameter Brabender single-screw extruder at 60 rpm, with the temperature set to 230° C. The first extrusion pass was performed under inert atmosphere. The extrudate was cooled by passing it through an ice water bath and then pelletized. These pellets were re-extruded, albeit under air, using the same RPM, temperature, and pelletizing conditions as before, for up to five additional passes. The results of this testing are shown in Table 8.

TABLE 8

Yellowness Results

| Stabilizer (ppm) | Extrusion Pass 1 Yellowness Index | Extrusion Pass 6 Yellowness Index |
|---|---|---|
| Control: octadecyl 3,5-di-t-butyl-4-hydroxyhydrocinnamate (200) + P1 (1200) | −2.87 | 1.88 |
| 2,6-distyryl-p-cresol (200) + P1 (1200) | −2.39 | 1.18 |

P1 is tris(nonylphenyl) phosphite

A relatively small increase in yellowness index is indicative of superior stabilizer efficacy. Thus, the results of this testing show that 2,6-distyryl-p-cresol, in combination with phosphite PI, gave superior color retention as compared to the control.

Example 7

Performance Evaluation of 2,6-Distyryl-p-Cresol in Styrene Butadiene Rubber Change in Mooney Viscosity Over Time During Oven Aging at 100° C.

This example illustrates the stabilizer efficacy of 2,6-distyryl-p-cresol both alone and in combination with a phosphite stabilizer, as compared to an unstabilized material (the control).

An e-SBR 1502 type resin was used. The coagulation agents were as follows: 7.5 mol % $H_2SO_4$ and 5 mol % $Al_2(SO_4)_3$ in water. e-SBR test specimens containing the stabilizer(s) shown in Table 9 were prepared and then placed in an oven at 100 EC for the oven aging experiments.

Mooney viscosities were measured on a viscTech Mooney viscometer from 30 gram samples (Temp: 100° C.; 1 min preheat time @ no rotation; measurement time 4 minutes after preheat). Mooney viscosity was measured on each formulation before oven aging, and then at regular intervals once the SBR test specimens had been exposed in the oven at 100° C. The results from this testing are shown in Table 9.

TABLE 9

Mooney Viscosity Results

| Stabilizer (phr) | Mooney viscosity (unaged) | Mooney viscosity after 14 days | Mooney viscosity After 21 days | Mooney viscosity After 42 days |
|---|---|---|---|---|
| Control (none) | 63 | 120 | 124 | n.d. |
| 2,6-distyryl-p-cresol (1) | 38 | 72 | 75 | n.d. |
| 2,6-distyryl-p-cresol (0.2) + P1 (0.8) | 42 | 57 | 70 | 82 |

P1 is tris(nonylphenyl) phosphite

A relatively small increase in Mooney viscosity is indicative of superior stabilizer efficacy. Thus, the results of this testing show that 2,6-distyryl-p-cresol, both alone and in combination with phosphite PI, gave superior stabilization compared to the no-add control.

Example 8

Synthesis of 2,6-distyryl-p-cresol (Two Reactor System)

This example illustrates a reaction system comprising two reactors and providing for a two tiered temperature profile for forming styrenated p-cresol. 50 Kg (110.2 lb, 462.2 moles) p-cresol was pumped from a preheated drum into a 50 gallon glass lined steel jacketed reactor equipped with an agitator, thermowell, and a pump around loop for sampling and acid injection. The p-cresol was heated to about 60° C. followed by the addition of 1.6 to 8.3 g (5.53e-05 to 1.07e-02 moles) of trifluoromethane sulfonic acid via a syringe in an injection port of the pump around loop. 93.9 Kg (207 1b, 901.6 moles) styrene was fed through a mass flow meter at a constant rate over a 3 to 4 hour reaction time where the reactor temperature was maintained at 70° C. The molar ratio of styrene to p-cresol fed was maintained at 1.95. After the completion of the styrene feed, the reactor contents were pumped to a second 50 gallon glass lined steel jacketed reactor and heated to 90° C. Approximately 1.5 lb (0.7 Kg) of acid-leached bentonite clay (Filtrol 20×) was added through a man hole to the second reactor and agitated for 15 minutes. The product was then pumped to a bag filter and into product drums. The typical sample result from this production, based on total GC area, are provided below in TABLE 10.

TABLE 10

| Component | % of total GC Area |
|---|---|
| Styrene | 0 |
| P-cresol | 0 |
| Mono | 4.8 |
| Di | 91.9 |
| Tri | 3.3 |

Example 9

Synthesis of 2,6-Distyryl-p-cresol (Single Reactor)

This example illustrates a reaction system comprising a single reactor for forming styrenated p-cresol. Example 9 was run in a manner similar to Example 8, with the exception that a single reactor was used for the 70° C. reaction and the 90° C. finishing reaction and clay addition were used. The styrene feed was fed over time periods ranging from 2.5 to 4 hours.

The amount of triflic acid used ranged from 1.7 to 2.6 g. The molar ratio of styrene to p-cresol was maintained at 1.95. The composition of the resulting styrenated p-cresol composition, based on total GC area, was as follows:

TABLE 11

| Component | % of total GC Area |
|---|---|
| Styrene | 0 |
| P-cresol | 0.03 |
| Mono | 6.9 |
| Di | 87.5 |
| Tri | 5.4 |

Using the conditions from Examples 8 and 9, the amount of Di could be calculated from the formula for the feed grams of triflic acid: % Di=(5.159)(ln(X))+115.01, where X=g triflic acid/mole cresol.

Example 10

Stabilization Study of PCMO Blends

This example illustrates the stabilization properties of the styrenated phenolic (p-cresol) compositions of the invention in a passenger car motor oil. The stabilizing ability of two styrenated p-cresol compositions (COM 1 & COM 2) of the present invention were determined. The compositions of the COM 1 and COM 2, by total GC area, are provided below.

TABLE 13

| Component | COM 1 | COM 2 |
|---|---|---|
| Mono | 5.6 | 22.8 |
| Di | 89.2 | 60 |
| Tri | 4.5 | 11.3 |

COM 1 and COM 2 were blended, respectively, with a passenger car motor oil (PCMO), specifically a 5W20 ILSAC GF-4 prototype (0.6 wt. % P) containing a Group II base stock. BLENDS 1A and 2A contained 0.5 weight percent of COM 1 and COM 2 styrenated p-cresol compositions, respectively, based on the total weight of the respective blends. Two additional blends (BLENDS 1B and 2B, respectively) were also formed containing 1.5 weight percent of COM 1 and COM 2 styrenated p-cresol compositions, respectively, based on the total weight of the respective blends. BLENDS 1A and 2A, as well as the PCMO without antioxidant (comparison), were analyzed by pressure differential scanning calorimetry (PDSC) at 160° C. and the results compared. BLENDS 1B and 2B were analyzed by PDSC at 185° C. An approximate 185° C. PDSC value for the comparison PCMO sample was determined from the 160° C. PDSC OIT value by reducing the 160° C. PDSC OIT value by 50% for every 10° C. increase. TABLE 14, below, summarizes the results of this analysis, and clearly show that the oxidative stability of these blends far exceeded that of the comparison PCMO.

A Thermo-oxidation Engine Oil Simulation Test (TEOST) (Moderately high temperature MHT) was conducted according to ASTM D7097, the entirety of which is incorporated herein by reference, to simulate the effect of engine operating conditions on the oxidation and deposit-forming tendencies of the Blends 1B and 2B and the comparative PCMO. The results, also shown in TABLE 14, clearly demonstrate that reduced deposits formed from the lubricant blends containing the styrenated p-cresol compositions of the invention when compared to the TEOST test for the comparative PCMO sample.

TABLE 14

| Sample | Styrenated P-Cresol Composition | Wt. % Styrenated P-Cresol | PDSC OIT 160° C. (min) | PDSC OIT 185° C. (min) | TEOST (mg) |
|---|---|---|---|---|---|
| PCMO (No AO) | N/A | 0 | 5.65 | 1* | 132 |
| BLEND 1A | COM 1 | 0.5 | 52.90 | — | — |
| BLEND 2A | COM 2 | 0.5 | 55.96 | — | — |
| BLEND 1B | COM 1 | 1.5 | — | 10.66 | 51.0 |
| BLEND 2B | COM 2 | 1.5 | — | 10.62 | 65.3 |

*estimated

Example 11

Stabilization Study of Industrial Turbine Oil Blends

This example illustrates the stabilization properties of the styrenated p-cresol compositions of the invention in an industrial turbine oil. The stabilizing ability of styrenated p-cresol compositions COM 1 and COM 2 of the present invention were determined in an industrial turbine oil (ITO) base stock (AO free, Group II base stock). The resulting blends, designated BLEND 1C and BLEND 2C, contained 1.0 weight percent of COM 1 and COM 2, respectively, based on the total weight of the respective blends. BLENDS 1C and 2C, as well as the ITO without antioxidant (comparison), were analyzed by rotary pressure vessel oxidative test (RPVOT) according to ASTM D2272, the entirety of which is incorporated herein by reference. The results, shown in TABLE 15, demonstrate that the oxidative stability of BLENDS 1C and 2C each were more than an order of magnitude greater than that of the comparison ITO without antioxidant.

TABLE 15

| Sample | Styrenated P-Cresol Composition | Wt. % Styrenated P-Cresol | RPVOT OIT (min) |
|---|---|---|---|
| ITO (No AO) | N/A | 0 | 24 |
| BLEND 1C | COM 1 | 1.0 | 338 |
| BLEND 2C | COM 2 | 1.0 | 305 |

Example 12

Color Stabilizing Effects of Styrenated Phenolics in Polyol

This example compares the color stabilizing effects of styrenated phenolic compositions, specifically the styrenated p-cresol composition COM 1 of Example 10, with comparative antioxidants, such as Naugard PS-48 (or Irganox 1135), Anox 1315, Irganox 1076 (or Anox PP18) or Isonox 132, in the formation of polyurethane foams. The comparative antioxidants did not form foams having good color stability over an extended period of time at above room temperatures. BHT (butylated hydroxytoluene, di-tert-butyl-para-cresol), a common antioxidant, is also known to have poor color stability, The above antioxidants were blended into a polyester polyol (Fomrez 2C53), which is commonly reacted with isocyanates to form polyurethanes, in amounts ranging from 8 wt. % to 22 wt. %, as indicated in Table 16, below. Foams produced from the polyester polyol containing Isonox 132 (2,6-di-tert-butyl-4-sec-butylphenol) have demonstrated discoloration problems over an extended period of time at above room temperature. The polyester polyols containing various antioxidants in different amounts were prepared by heating Fomrez 2C53 containing no antioxidant in an oven at 70° C. for three hours, followed by mixing with various antioxidants as indicated below.

TABLE 16

| Sample | Wt. of Polyol (gr) | Antioxidant | Wt. of AO (gr (Wt. %)) |
|---|---|---|---|
| 1 | 3960 | None | 0 (0%) |
| 2 | 3733 | Naugard PS-48 | 11.10 (0.298%) |
| 3 | 3744 | Naugard PS-48 | 22.03 (0.596%) |
| 4 | 3650 | Anox 1315 | 13.51 (0.370%) |
| 5 | 3257 | Irganox 1076 | 13.22 (0.405%) |
| 6 | 3655 | COM 1 | 8.84 (0.241%) |
| 7 | 3449 | COM 1 | 16.63 (0.482%) |

Samples 1-7 were sent to a testing company, which reacted the polyol with TDI (toluene diisocyanate) to form foams for color stability testing. The test results indicated that foams formed from Samples 6 and 7 containing styrenated phenolic compositions of the present invention passed tests for color stability over an extended period of time at above room temperature. Sample 7, containing 0.482 wt. % styrenated phenolics gave the best performance, and Sample 6, containing 0.241 wt. % styrenated phenolics gave the second best performance. Foams formed from Samples 1-5 failed the color stability tests over an extended period of time at above room temperature. Similarly stable foams would be expected when combining the styrenated phenolics of the invention with polyether polyols for polyurethane applications.

Example 13

Preparation of Low Colored Phenolic Stabilizers by Styrenation of o-Cresol and o-Cresol/p-Cresol Mixtures 2-Methyl-4,6-di-(1-phenylethyl)-phenol has previously been prepared by the Aluminum catalyzed reaction of o-Cresol and Styrene. Under the disclosed conditions, conversions to the desired compound are low (ca. 75%) and the reaction product is highly coloured (11 Gardner) requiring that 2-methyl-4,6-di-(1-phenylethyl)-phenol be purified by distillation prior to use as an antioxidant in synthetic polymers.

This example demonstrates that the reaction of styrene with o-cresol in the presence of trifluoromethane sulphonic acid (optionally in combination with phosphites) produces a reaction product (conversion to 2-methyl-4,6-di-(1-phenylethyl)-phenol and corresponding mono and tri species) at conversions greater than 95%, and having an APHA color value less than 150. The resulting styrenated phenolic composition (styrenated o-cresol) can be used as an antioxidant in synthetic polymers without purification or distillation.

To a one liter round-bottomed flask equipped with a stirrer, thermometer, and addition funnel was charged 100 grams (0.925 mols; $H_2O$<250 ppm) of o-cresol and 20 μL (0.226 mmols) of Trifluoromethanesulphonic acid. The mixture was heated to 60° C. under a nitrogen blanket. Once that internal temperature was stable, 193 grams (1.85 mols) of styrene was placed into the funnel and then added dropwise, with stirring, over a period of four hours. During styrene addition, the pot temperature did not exceed 70° C. Stirring was continued at a pot temperature of 60° C. for a period of 1 hour after all the styrene had been added. 100 g of water was added to the stirred reaction. After 30 min the reaction was allowed to settle, the aqueous layer removed and organic layer dried at 80° C. and a vacuum of 4 mm. The resultant styrenated o-cresol/p-cresol composition analyzed as follows:

TABLE 17

| Gas Chromatography (GC) RESULTS (Area %) | |
|---|---|
| p-Cresol | 0.05 |
| Sum Monostyrenated o-cresol + p-cresol | 6.89 |
| Sum 2,6-Distyrenated o-cresol + p-cresol | 91.0 |
| Tristyrenated p-cresol | 1.89 |
| Total Area | 99.83 |

APHA value = 50
Kinematic Viscosity = 1,188 cSt (30° C.)
Weight Yield = 93%

The methodology was also applied to the reaction of Styrene with mixed ortho- and para-Cresol to yield mixed 2-methyl-4,6-di-(1-phenylethyl)-phenol and 4-methyl-2,6-di-(1-phenylethyl)-phenol (as well as minor amounts of corresponding mono and tristyrenated species), which can also, without purification by distillation, be used as an antioxidant in synthetic polymers.

To a one liter round-bottomed flask equipped with a stirrer, thermometer, and addition funnel was charged 50 grams (0.46 mols; $H_2O$<250 ppm) of p-cresol, (50.0 g, 0.46 mols; $H_2O$<250 ppm), 50 grams (0.46 mols; $H_2O$<250 ppm) of o-cresol and 20 μL (0.226 mmols) of Trifluoromethanesulphonic acid. The mixture was heated to 60° C. under a nitrogen blanket. 193 grams (1.85 mols) of styrene was placed into the funnel and then added dropwise, with stirring, over a period of four hours. During styrene addition, the internal temperature did not exceed 70° C. After all the styrene had been added, stirring was continued at an internal temperature of 60° C. for a period of 1 hour. 100 g of water was added to the stirred reaction. After 30 min the reaction was allowed to settle, the aqueous layer removed and organic layer dried at 80° C. and a vacuum of 4 mm. The resultant styrenated o-cresol/p-cresol composition analyzed as follows:

TABLE 18

| Gas Chromatography (GC) RESULTS (Area %) | |
|---|---|
| Sum o-cresol + p-cresol | 0.05 |
| Sum monostyrenated o-cresol + monostyrenated p-cresol | 4.31 |
| Sum 2,4-distyrenated o-cresol + 2,6-distyrenated p-cresol | 91.6 |
| Sum tristyrenated o-cresol + tristyrenated p-cresol | 2.76 |
| Total Area | 98.72 |

APHA value = 75
Kinematic Viscosity = 3,135 cSt (30° C.)
Weight Yield = 92%

Example 14

Preparation of Low Colored Phenolic Stabilizers by Styrenation of Phenol

To a one liter round-bottomed flask equipped with a stirrer, thermometer, and addition funnel was charged 100 grams (1.06 mols; $H_2O<250$ ppm) of phenol and 20 μL (0.226 mmols) of Trifluoromethanesulphonic acid. The mixture was heated to 60° C. under a nitrogen blanket. Once that internal temperature was stable, 332 grams (3.16 mols) of styrene was placed into the funnel and then added dropwise, with stirring, over a period of four hours. During styrene addition, the pot temperature did not exceed 70° C. After all the styrene had been added, the reaction was stirred at a pot temperature of 60° C. for a period of 1 hour. 100 g of water was then added to the stirred reaction. After 30 min the reaction was allowed to settle, the aqueous layer removed and organic layer dried at 80° C. and a vacuum of 4 mm. The resultant styrenated phenol composition analyzed as follows:

TABLE 18

| Gas Chromatography (GC) RESULTS (Area %) | |
|---|---|
| Phenol | 0.28 |
| Sum Monostyrenated phenol | 3.91 |
| Sum Distyrenated phenol | 9.2 |
| Sum of Tristyrenated phenol | 81.6 |
| Sum of Tetratyrenated phenol | 4.16 |
| Total Area | 99.15 |

APHA value = 50
Kinematic Viscosity = 7,495 cSt (30° C.)
Weight Yield = 94%.

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible.

What is claimed is:

1. A stabilized composition comprising a thermoplastic, thermoelastomer, rubber or lubricant and from about 0.01 to about 10% by weight based on the total weight of the stabilized composition of a liquid styrenated phenolic composition, said phenolic composition comprising:
   (a) at least one 2,6-distyrenated p-cresol in an amount of from about 80 to about 95 percent by total Gas Chromatography area;
   (b) at least one monostyrenated-p-cresol in an amount greater than 1 percent by total Gas Chromatography area; and
   (c) at least one tristyrenated-p-cresol in an amount greater than 1 percent by total Gas Chromatography area,
   wherein the composition comprises the monostyrenated-p-cresol and the tristyrenated-p-cresol, in combination, in an amount from 5 to 20 percent by total Gas Chromatography area.

2. The composition of claim 1 further comprising a co-stabilizer selected from the group consisting of phenolics, phosphites, diaryl amines, and epoxidized vegetable oils.

3. The composition of claim 2, wherein the co-stabilizer is an organophosphite.

4. The composition of claim 3, wherein the organophosphite is tris(nonylphenyl)phosphite.

5. The composition of claim 1, wherein the co-stabilizer is a dialkylated diphenylamine.

6. A polymer article according to claim 1 comprising a thermoplastic, thermoelastomer or rubber and a liquid styrenated phenolic composition, from about 0.01 to about 10% by weight based on the total weight of the polymer article of the liquid styrenated phenolic composition.

7. The polymer article according to claim 6, wherein the polymer is selected from the group consisting of polyolefins, PVC, polyurethanes, polyols and elastomers.

8. The polymer article of claim 6, wherein the polymer is styrene-butadiene rubber.

9. The polymer article of claim 6, wherein the polymer article comprises a polyol or a polyurethane and the composition exhibits low fog.

10. A lubricant according to claim 1 comprising a base stock of lubricating viscosity and from about 0.01 to about 10% by weight based on the total weight of the lubricant of the liquid styrenated phenolic composition.

11. The lubricant of claim 10 wherein the lubricant composition comprises the base stock in an amount greater than 90 weight percent, and the styrenated phenolic in an amount greater than 0.05 weight percent, based on the weight of the lubricant.

12. The lubricant of claim 11, wherein the lubricant comprises the lubricant base stock in an amount greater than 95 weight percent, and the styrenated phenolic in an amount from 0.1 to 5 weight percent, based on the weight of the lubricant.

13. The lubricant of claim 10, wherein the lubricant composition further comprises at least one antioxidant comprising one or more secondary diarylamines having the general formula:

formula:

$(R_4)_a$—$Ar_1$—NH—$Ar_2$—$(R_5)_b$ wherein $Ar_1$ and $Ar_1$ are independent and comprise aromatic hydrocarbons, $R_4$ and $R_5$ are independent and comprise hydrogen and hydrocarbyl groups and a and b are independent and 0 to 3, provided that (a+b) is not greater than 4.

* * * * *